US006799199B1

(12) United States Patent
Segal et al.

(10) Patent No.: US 6,799,199 B1
(45) Date of Patent: *Sep. 28, 2004

(54) MEDIA MONITOR SYSTEM

(75) Inventors: Edo Segal, Los Angeles, CA (US); Boaz Jaschek, Ra'anana (IL); Sharon Fridman, Givata'im (IL); Michal Avni, Tel Aviv (IL)

(73) Assignee: The Relegence Corporation, Los Angeles, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 09/654,822

(22) Filed: Sep. 5, 2000

Related U.S. Application Data

(63) Continuation-in-part of application No. 09/481,206, filed on Jan. 11, 2000.
(60) Provisional application No. 60/180,660, filed on Feb. 7, 2000.

(51) Int. Cl.[7] .............................................. G06F 15/16
(52) U.S. Cl. .................... 709/207; 709/201; 709/218; 709/219; 709/224; 707/6
(58) Field of Search ................ 709/224, 201, 709/207, 218, 219; 707/6

(56) References Cited

U.S. PATENT DOCUMENTS

| 5,724,424 | A |   | 3/1998  | Gifford              |        |
|-----------|---|---|---------|----------------------|--------|
| 5,886,746 | A |   | 3/1999  | Yuen et al.          |        |
| 5,890,152 | A | * | 3/1999  | Rapaport et al.      | 707/6  |
| 5,970,206 | A |   | 10/1999 | Yuen et al.          |        |
| 6,052,145 | A |   | 4/2000  | Macrae et al.        |        |
| 6,091,882 | A |   | 7/2000  | Yuen et al.          |        |
| 6,101,493 | A |   | 8/2000  | Marshall et al.      |        |
| 6,226,635 | B1 | * | 5/2001  | Katariya            | 707/4  |
| 6,269,368 | B1 | * | 7/2001  | Diamond             | 707/6  |
| 6,311,189 | B1 | * | 10/2001 | deVries et al.      | 707/102 |
| 6,327,590 | B1 | * | 12/2001 | Chidlovskii et al.  | 707/5  |
| 6,381,594 | B1 | * | 4/2002  | Eichstaedt et al.   | 707/3  |
| 6,574,632 | B2 | * | 6/2003  | Fox et al.          | 707/102 |
| 6,591,245 | B1 | * | 7/2003  | Klug                | 705/10 |
| 6,594,629 | B1 | * | 7/2003  | Basu et al.         | 704/251 |
| 2002/0056100 | A1 | * | 5/2002 | Shimomura et al.    | 725/39 |

OTHER PUBLICATIONS

Buckley, Chris and Lewit, Alan F., Optimization of inverted vector searches, 1985, ACM Press New York, NY, USA— pp. 97–110.*
Co–pending application 09/618656 entitled: "Apparatus and Method for Dynamic Advertisement", filed Jul. 18, 2000.
Co–pending application 09/655185 entitled: "System and Method for Real–Time Searching", filed Sep. 5, 2000.
Co–pending application 09/654801 entitled: "System and Method for Real–Time Alerts", filed Sep. 5, 2000.
Co–pending application 09/654634 entitled: "Media Monitor Page and Method for Creating the Same", filed Sep. 5, 2000.

* cited by examiner

*Primary Examiner*—David Wiley
*Assistant Examiner*—Thomas J Mauro, Jr.
(74) *Attorney, Agent, or Firm*—Merchant & Gould P.C.

(57) ABSTRACT

A media monitor system monitors content of a plurality of information streams provided by a plurality of information sources coupled to a media monitor system. The media monitor system is adapted to be coupled to a plurality of client systems, the media monitor system includes an information retriever, a distributor, and an analyzer. The analyzer has a real time search engine and a real time alert engine.

76 Claims, 17 Drawing Sheets

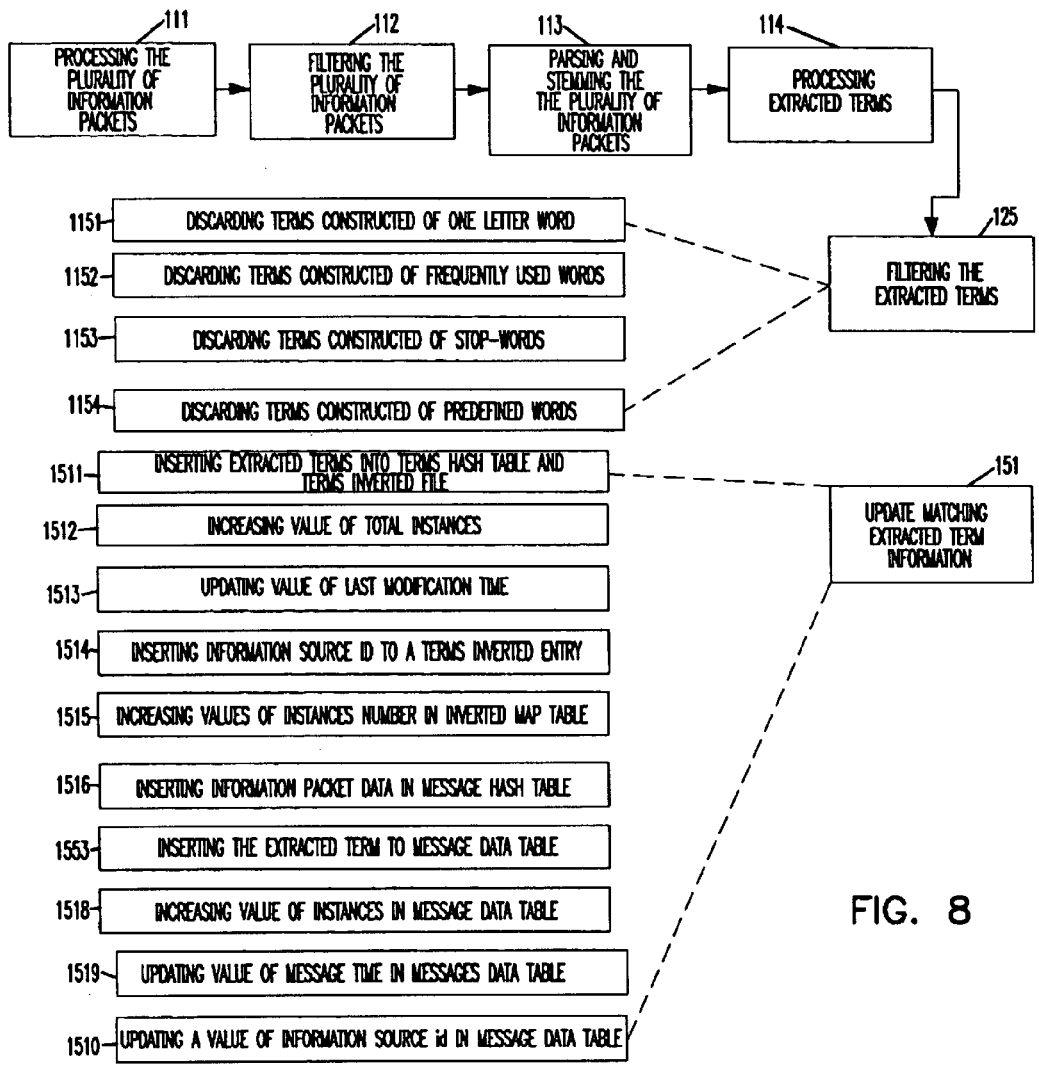
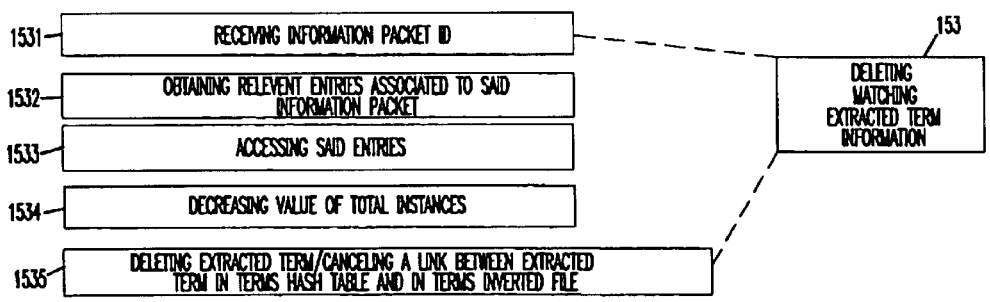
FIG. 8

MEDIA MONITOR SYSTEM

RELATED APPLICATIONS

This application is a continuation in part of application U.S. Ser. No. 09/481,206 filed Jan. 11, 2000. This application claims the benefit of provisional application No. 60/180,660, filed Feb. 9, 2000.

FIELD OF THE INVENTION

The present invention generally relates to media monitor page and method for creating a media monitor page and especially for a system and method for allowing users of client systems to view selected portions of information streams of interest.

BACKGROUND OF THE INVENTION

A vast amount of information is generated, transferred, broadcast, transmitted and exchanged via various media and in various forms. Prior art systems and methods were not able to monitor and analyze said information in real time, in a satisfactory manner.

There is a growing need to monitor and analyze said information in real time. There is a growing need to display various information packets and streams of interest being generated by a variety of information sources and for allowing a user to view additional information from an information source that provided an information of interest.

SUMMARY OF THE INVENTION

It should be noted that the particular terms and expressions employed and the particular structural and operational details disclosed in the detailed description and accompanying drawings are for illustrative purposes only and are not intended to in any way limit the scope of the invention as described in the appended claims. The invention provides a fast, accurate, scalable without significant loss of performance method for real time alert that is maintained to be significantly current in real-time.

The term "information stream" as used herein will be understood to encompass, but not be limited to, multimedia streams, video streams, audio streams, data streams. Said information stream can be part of an internet broadcast program, radio program, television program, or any other type of program that is transmitted for reception by at least one client. Said information stream can be transmitted/broadcasted by various means and over various media, such as cables, wires, networks, satellite transmission and wireless transmission.

The invention provides a media monitor system for monitoring a content of a plurality of information streams provided by a plurality of information sources coupled to said media monitor system, said media monitor system adapted to be coupled to a plurality of client systems, said media monitor comprising: retrieval means, adapted to be coupled to the plurality of information sources, for receiving information streams from the information sources, and providing information signals representative of at least a portion of the information streams to an analysis means; distribution means, adapted to be coupled to a plurality of client systems, for receiving client queries and client requests to update or create alert criteria, and for providing client systems real time alerts and query results; and analysis means, coupled to the distribution means and to the retrieval means for storing said information signals, for real time matching of information signals against alert criteria to generate a real time alert and for real time matching of client queries against the information signals to generate query results.

The invention provides a media monitor system wherein the information signals are computer readable signals.

The invention provides a media monitor system wherein the information signals are information packets.

The invention provides a media monitor system wherein the distribution means comprising of: a plurality of interfaces, each interface for receiving, from at least one client system, client requests and client queries in a client system format, said client system format differs from a media monitor system compatible format, and formatting the client requests and the client queries in a monitor media system compatible format, for receiving alerts and query results in a media monitor system format, converting said received alerts and query results to the client system compatible format, and for dispatching said converted alerts and said converted query results to at least one designated client system; a client manager, coupled to said plurality of interfaces, for storing and updating client system profiles, for processing said client profiles to determine at least one parameter selected from a group consisting of: the designated client systems, a format of an alert, a format of a query result, relevant information to add to the alert, relevant information to add to the query result; a dispatcher, coupled to the client manager and to the plurality of interfaces, for receiving said at least one parameter from the client manager, to fetch relevant information from the analysis means and for providing alerts and query results client systems or said plurality of interfaces.

The invention provides a media monitor system wherein the distribution means further comprising of query and alert manager, for receiving client requests and client queries from the dispatcher and providing them to the analysis means;
a data builder, coupled to the dispatcher and to the analysis means, for receiving requests from the dispatcher to fetch relevant information from the analysis means, accessing the analysis means, fetching said relevant information and for providing the relevant information to the dispatcher; a history manager for storing client queries and client requests to update to create alert criteria and for client system retrieval.

The invention provides a media monitor system wherein the retrieval means comprising of a plurality of agents selected from a group of agents consisting of:
an agent having an audio recognition means, adapted to receive information streams comprising of audio information and to generate a stream of information packets representative of the content of the audio information; an agent having a encoder, adapted to receive information streams comprising of audio information and to generate a stream of information packets containing said audio information;
an agent having an visual recognition means, adapted to receive information streams comprising of visual information and to generate a stream of information packets representative of the content of the visual information; an agent having a encoder, adapted to receive information streams comprising of visual information and to generate a stream of information packets containing said visual information;
an agent having a parsing means, adapted to receive a stream of computer readable signals and to parse said stream to provide a plurality of information packets.

The invention provides a media monitor system wherein the analysis means comprising of:
a real time alert logic, for real time matching of information signals against alert criteria to generate a real time alert; and a real time search engine, for real time matching of client queries against the information signals to generate query results.

The invention provides a media monitor system further comprising data manager for storing said information signals, and for allowing the distribution means to fetch relevant information associated to information signal that caused said alert module to issue an alert.

The invention provides a media monitor system wherein the information signal is an information packet and wherein the real time search engine comprising: an information packet processor, for receiving an information packet and for processing the information packet to generate at least one processed portion of the information packet; a storage means, coupled to the information packet processor and to a storage means, for temporarily storing information representative of a reception of the at least one processed portion of the information packet, the storage means are configured to allow fast insertion and fast deletion of content; and a query and result manager, coupled to the storage means, for matching a received client query against at least a portion of a content of the storage means to generate a query result.

The invention provides a media monitor system further comprising at least one module selected from a group of modules consisting of: a message coordinator module adapted to coordinate an handling of a plurality of information packets; a message buffer adapted to hold temporarily the plurality of information packets; a message filter module for filtering the plurality of information packets according to predefined rules; a term extractor module for performing parsing and stemming on said plurality of information packets; a terms filter for excluding extracted terms according to predefined rules; a queries coordinator module to coordinate the processing of client queries; a query-term extractor to parse and stem incoming queries in order to extract and process operative query-terms;

a query-terms filter for excluding specific query-terms in a predefined manner;

an archive search module for indexing data on said archive files containing historical informational content and for returning results according to said indexed data; a semi-static database search module to act on a semi-static database holding semi-static information source control data; a future search module for matching extracted terms from the plurality of information packets against static queries; and a queries index for holding queries for a predefined time frame to provide means of future search.

The invention provides a media monitor system wherein the storage means is a term index data structure.

The invention provides a media monitor system wherein the term index data structure is adapted to hold indexed extracted terms and information packet identifiers.

The invention provides a media monitor system wherein the term index data structure further comprising: a terms hash table to hold extracted, filtered and processed terms; a terms inverted file pointed to by said term hash table holding a terms inverted-entry map; a messages hash table to hold information packets identification; a messages data table to hold information packets data; and a channel map to hold a list of information sources and the related number of index terms of said information source.

The invention provides a media monitor system wherein the terms inverted file further comprising: a terms inverted entries map table; a total instances of said term; a number of information sources containing said term; and a last modification time of said term.

The invention provides a media monitor system further comprising: a message terms keyed map; an information source identification; and an information packet time of arrival.

The invention provides a media monitor system wherein the message terms keyed map further comprising: a pointer to said terms inverted file; an instances number of said term in said information packet; and a pointer to said inverted file entry related to said term.

The invention provides a media monitor system wherein the terms inverted entries map further comprising; an information source identification; an instances number of said term in said information source informational content; and a time of last appearance of said term in said information source informational content.

The invention provides a media monitor system wherein said high update storage means allows fast insertion and deletion of content.

The invention provides a media monitor system wherein the fast update storage means further allows timely deletions of irrelevant or time-decayed terms and query-terms.

The invention provides a media monitor system further comprising of at least one of the following means: adding means for adding control data to said information packets; filtering means for the plurality of information packets; processing means for said extracted terms by adding control information to said extracted terms; and term filtering means for the extracted terms to generate filtered extracted terms.

The invention provides a media monitor system wherein the extracted terms are extracted out of the plurality of information packets by parsing and stemming the plurality of information packets; and wherein the term filtering means are adapted to (a) discarding said terms constructed of one-letter words; (b) discarding said terms constructed of frequently used words; (c) discarding said terms constructed of stop-words; and (d) discarding said terms constructed of predefined words.

The invention provides a media monitor system wherein the control data comprising of information packet identification, information source identification and time of arrival.

The invention provides a media monitor system further adapted to receive an information packet, to storing information packet with an associated packet identifier in an information packet storage means, store extracted term information representative of a reception of at least one extracted term, said at least one extracted terms extracted from the information packet; and to link between the stored information packet and the extracted term information.

The invention provides a media monitor system further adapted to delete an information packet and delete the linked extracted term information.

The invention provides a media monitor system wherein information packet are stored in a messages hash, and wherein the linked extracted term information is stored in a terms hash.

The invention provides a media monitor system wherein the extracted term information comprising of at least one information field selected from a group consisting of: a last modification time field, indicating a most recent time in which the extracted term was received; a number of channels containing term, indicating a number of information sources that provided the extracted term; a total instances field, indicating a number of times the extracted term was provided; and a terms inverted entries map, comprising of a plurality of terms inverted file entries, each entry holding information representative of a reception of the extracted term from a single information source.

The invention provides a media monitor system wherein each inverted file entry comprising of at least one field selected from a group consisting of:

a channel identifier, for identifying the information source that provided the extracted term; instances number, for indicating a number of times the extracted term was provided by an information source; and time of last appearance, for indicating a most recent time in which the extracted term was received from an information source.

The invention provides a media monitor system wherein each information packet is further associated to a message terms key map, said message key map comprising of a plurality of message characteristic entries, each message characteristic entry associated to an extracted term being extracted from the information packet, said message characteristic entry comprising of at least one of the following fields selected from a group consisting of: a term inverted file, for pointing to the term extracted information; an instance of number, for indicating a number of time said extracted term appeared in the information packet; and a inverted file entry, for pointing to a terms inverted file entry.

The invention provides a media monitor system further adapted to insert an extracted term into a terms hash table and into a terms inverted file, insert an information source identification, said information source provided the extracted term, to a terms inverted entry map table in said terms inverted file, insert information packet data in a messages hash table; insert the extracted term from said information packet to a messages data table; increase a value of instances in said messages data table by one; and update a value of information source identification in said message data table.

The invention provides a system further adapted to extract an extracted term and accordingly to perform at least one operation selected from a group consisting of: increase a value of total instances in said terms inverted file; update a value of last modification time in said terms inverted file; increase a value of instances number in said inverted entry map table associated with said information source identification in said terms inverted file; and update a value of message time in said messages data table.

The invention provides a system further adapted to delete an information packet, and accordingly to perform at least one operation selected from a group consisting of: receive an information packet identification, whereas the terms extracted from the information packets are to be deleted; read the information packet identification from the messages hash table in said terms index data structure; obtain relevant entries of said extracted terms belonging to said information packet in said messages data; and
access said terms inverted file for each said terms entry pointed to said terms inverted file.

The invention provides a system further adapted to store alert criteria and to match alert criteria received and processed in the past against newly received terms to generate an alert.

The invention provides a system further adapted to match the client query against historical archives of informational content to generate an archive query result.

The invention provides a media monitor system further adapted to generate a query result from an archive query result and from a recent query result.

The invention provides a system further adapted to match the client query against a semistatic database of said informational content and having a low incidence of changing to generate a semi static query result.

The invention provides a media monitor system wherein the system further adapted to generate a query result from a semi static query result and from a recent query result.

The invention provides a system further adapted to rank information sources according to a similarity between at least a portion of information packets provided by said information sources and between the client query.

The invention provides a media monitor system further adapted to insert a list of ranked information sources in the query result.

The invention provides a media monitor system wherein the step of ranking is based upon a parameter out of a group consisting of: a total amount of extracted terms provided by an information source in a predefined time interval; an elapsed time since the extracted term was provided by the information source in said predefined time interval; and an extracted term position in the information source.

The invention provides a system wherein an information source is selected from a group consisting of: television broadcast providers; radio broadcast providers; data network providers, chat channels providers, news providers, and music providers.

The invention provides a system wherein information packets comprise of content selected from a group of: text, audio, video, multimedia, and executable code streaming media.

The invention provides a system further adapted to compute a similarity between a client query and a group of at least one information packet.

The invention provides a media monitor system wherein the group of at least one information packet comprising of at least one information packet received from a single information source.

The invention provides a media monitor system wherein the similarity reflects at least one of the following parameters: a total amounts of extracted terms being received from at least one information source during a predefined time interval;
a number of relevant extracted terms being received from at least one information source during the predefined time interval; a total number of information sources being searched during the predefined time interval; an elapsed time since a last appearance of a relevant extracted term from an information source during the predefined time interval; a position of relevant extracted terms in at least one information source; extracted term in proximity to a relevant extracted term; a part of speech of a relevant extracted term; and a relevant extracted term frequency and importance in a language of the information source.

The invention provides a system adapted to implement a matching technique selected from a group consisting of: Boolean based matching; probabilistic matching; fuzzy matching; proximity matching; and vector based matching.

The invention provides a system adapted to implements complex matching techniques.

The invention provides a system wherein the wherein the information signal is an information packet and wherein the real time alert logic comprising:
an information packet processor, for receiving an information packet; and extracting at least one extracted term out of the information packet; said information packets either provided by an information source or representative of a portion of a received signal provided by an information source; a storage means, configured to allow fast insertion and fast deletion of content, for storing matching term information representative of a reception of matching extracted terms, an alert criteria comprising of at least one alert term; a storage means controller, coupled to the information packet processor and to the storage means, for receiving the at least one extracted term, for determining whether an extracted term out of said at least one extracted term matches an alert term, and accordingly for updating the matching term information; and an alert module, coupled to the storage means, for processing at least a portion of the matching extracted term information to determine whether to issue an alert; and for issuing at least one alert to at least one client system, according to said determination.

The invention provides a system wherein the portion of the matching extracted term information is determined by at least one alert criteria.

The invention provides a media monitor system wherein the at least one alert criteria comprising of at least one alert term that matched the at least one matching extracted term.

The invention provides a system wherein the matching term information representative of a reception of matching extracted terms during a predetermined period of time.

The invention provides a system the storage means controller further adapted to store the information packet and related control data in the storage means, and to link between the stored information packet and the matching extracted term information.

The invention provides a system wherein the storage means holds a term index data structure.

The invention provides a system wherein the information packet processor is further adapted to perform at least one preprocessing step selected from a group consisting of: adding control data to said information packet; filtering the information packet; processing an extracted term by adding control information to said extracted term; and filtering the extracted term, wherein said filtered extracted terms are matched against alert terms.

The invention provides a system wherein the information packet processor is configured to extract an extracted term from an information packet by parsing and stemming the information packet.

The invention provides a system wherein the storage means controller is adapted to delete information packets from the storage means, after a predetermined period has lapsed; and wherein a deletion of an information packet is followed by a deletion of the linked extracted term information.

The invention provides a system wherein alert terms and matching terms information are stored in an alert terms hash, alert criteria are stored in an alert criteria map and wherein the linked information packets are stored in a message hash.

The invention provides a system wherein the matching extracted term information comprising of at least one information field selected from a group consisting of: a last modification time field, indicating a most recent time of reception of the matching extracted term, during a predetermine period of time;
a number of channels containing term, indicating a number of information sources that provided the matching extracted term during a predetermine period of time; a total instances field, indicating a total amount of receptions of the matching extracted term during a predetermine period of time; and a terms inverted entries map, comprising of a plurality of matching terms inverted file entries, each entry holding information representative of a reception of the matching extracted term from a single information source during a predetermine period of time.

The invention provides a media monitor system wherein each matching term inverted file entry comprising of at least one field selected from a group consisting of: a channel identifier, for identifying the information source that provided the matching extracted term during a predetermine period of time; instances number, for indicating a total amount of receptions of the matching extracted term from an information source during a predetermine period of time; and time of last appearance, for indicating a most recent time of reception of the matching extracted term from an information source during a predetermine period of time.

The invention provides a media monitor system wherein each information packet is further associated to a message terms key map, said message key map comprising of a plurality of message characteristic entries, each message characteristic entry associated to an matching extracted term being extracted from the information packet, said message characteristic entry comprising of at least one of the following fields selected from a group consisting of: a term inverted file, for pointing to the matching extracted term information; an instance of number, for indicating a number of time said matching extracted term appeared in the information packet; and a inverted file entry, for pointing to a terms inverted file entry.

The invention provides a system wherein the storage means controller is further adapted to determine a deletion of an information packet and associeted matching extracted term information.

The invention provides a system wherein the storage means controller is adapted to access the message hash table, to obtain relevant entries of said matching extracted terms belonging to said information packet; and to access said matching extracted terms inverted file for each said matching extracted terms entry pointed to said matching extracted terms inverted file.

The invention provides a media monitor system wherein the alert module is adapted to rank information sources according to a similarity between at least a portion of information packets provided by said information sources and between an alert criteria.

The invention provides a system the said rank is based upon a parameter out of a group consisting of: a total amount of extracted terms provided by an information source in a predefined time interval; an elapsed time since the extracted term was provided by the information source in said predefined time interval; and an extracted term position in the information source.

The invention provides a system wherein an information source is selected from a group consisting of: data network providers, chat channels providers, news providers, and music providers.

The invention provides a system wherein information packets comprise of content selected from a group of: text, audio, video, multimedia, and executable code streaming media.

The invention provides a system further adapted to compute a similarity between an alert criteria and information indicating a reception of a group of at least one matching information packet.

The invention provides a media monitor system wherein the group of at least one information packet comprising of at least one information packet received from a single information source.

The invention provides a media monitor system wherein the similarity reflects at least one of the following parameters: a total amounts of extracted terms being received from at least one information source during a predefined time interval;
a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term;
a part of speech of a matching extracted term; and a matching extracted term frequency and importance in a language of the information source.

The invention provides a system wherein the alert module further adapted to implement a matching technique selected from a group consisting of: Boolean based matching; probabilistic matching; fuzzy matching; proximity matching; and vector based matching.

The invention provides a system wherein the alert module further adapted to implement complex matching techniques.

The invention provides a system wherein an alert comprising of at least one field selected from a group consisting of:
an information source identifier field, for identifying an information source that either provided a matching extracted packer or for identifying an information source that provided a received signal, whereas a portion of said received signal being represented in an information packet from which the extracted term was extracted;
a link field, for allowing the client system to be linked to the information source or for allowing the client system to receive relevant information from said information source; and an information source category identification, identifying a category of information source that provided the matching extracted term.

The invention provides a media monitor system wherein a relevant information is selected from a group consisting of: a multimedia stream originated by said information source; a stream of information packets originated by said information source; a multimedia stream associated to the information packet from which the extracted term was extracted; a stream of information packets, comprising the extracted term.

The invention provides a system whereas the information packet processor comprising of at least one module selected from a group of modules consisting of:
a message coordinator module adapted to coordinate an handling of a plurality of information packets; a message filter module for filtering the plurality of information packets according to predefined rules; a term extractor module for performing parsing and stemming on said plurality of information packets; and a terms filter for excluding extracted terms according to predefined rules.

The invention provides a system wherein the storage means holds a term index data structure, said term index data structure further comprising:
an alert terms hash table to hold alert terms ; an matching extracted terms inverted file pointed to by said alert term hash table holding a matching extracted terms inverted entry map; a messages hash table to hold information packets identification; a messages data table to hold information packets data; and
a channel map to hold a list of information sources and the related number of index terms of said information source.

The invention provides a media monitor system wherein the terms inverted file further comprising: an matching extracted terms inverted entries map table;
a total instances of said matching extracted term; a number of information sources containing said matching extracted term; and a last modification time of said matching extracted term.

The invention provides a media monitor system further comprising: a message terms keyed map; an information source identification; and an information packet time of arrival.

The invention provides a media monitor system wherein the message terms keyed map further comprising: a pointer to said matching extracted terms inverted file; an instances number of said matching extracted term in said information packet; and a pointer to said inverted file entry related to said matching extracted term.

The invention provides a media monitor system wherein the matching extracted terms inverted entries map further comprising; an information source identification; an instances number of said matching extracted term in said information source informational content; and a time of last appearance of said matching extracted term in said information source informational content.

The invention provides a system wherein the storage means further allows timely deletions of irrelevant or time-decayed terms and query-terms.

The invention provides a system further comprising an alert criteria module, coupled to the storage means, to the storage means controller and to a plurality of client systems, for handling client system requests form updating alert criteria.

The invention provides a media monitor system wherein the alert criteria module comprising of at least one module selected from a group consisting of:
an alert criteria coordinator module to coordinate the processing of alert criteria; an alert term extractor to parse and stem incoming alert criteria in order to extract and process operative alert terms; and an alert terms filter for excluding specific alert terms in a predefined manner.

BRIEF DESCRIPTION OF THE DRAWINGS

The present disclosure will be understood and appreciated more fully from the following detailed description taken in conjunction with the drawings in which:

FIG. 6–8 are flow charts illustrating a method for real time alert, in accordance with a preferred embodiment of the invention;

DETAILED DESCRIPTION OF THE PREFERRED EMBODIMENT

Figure 1:
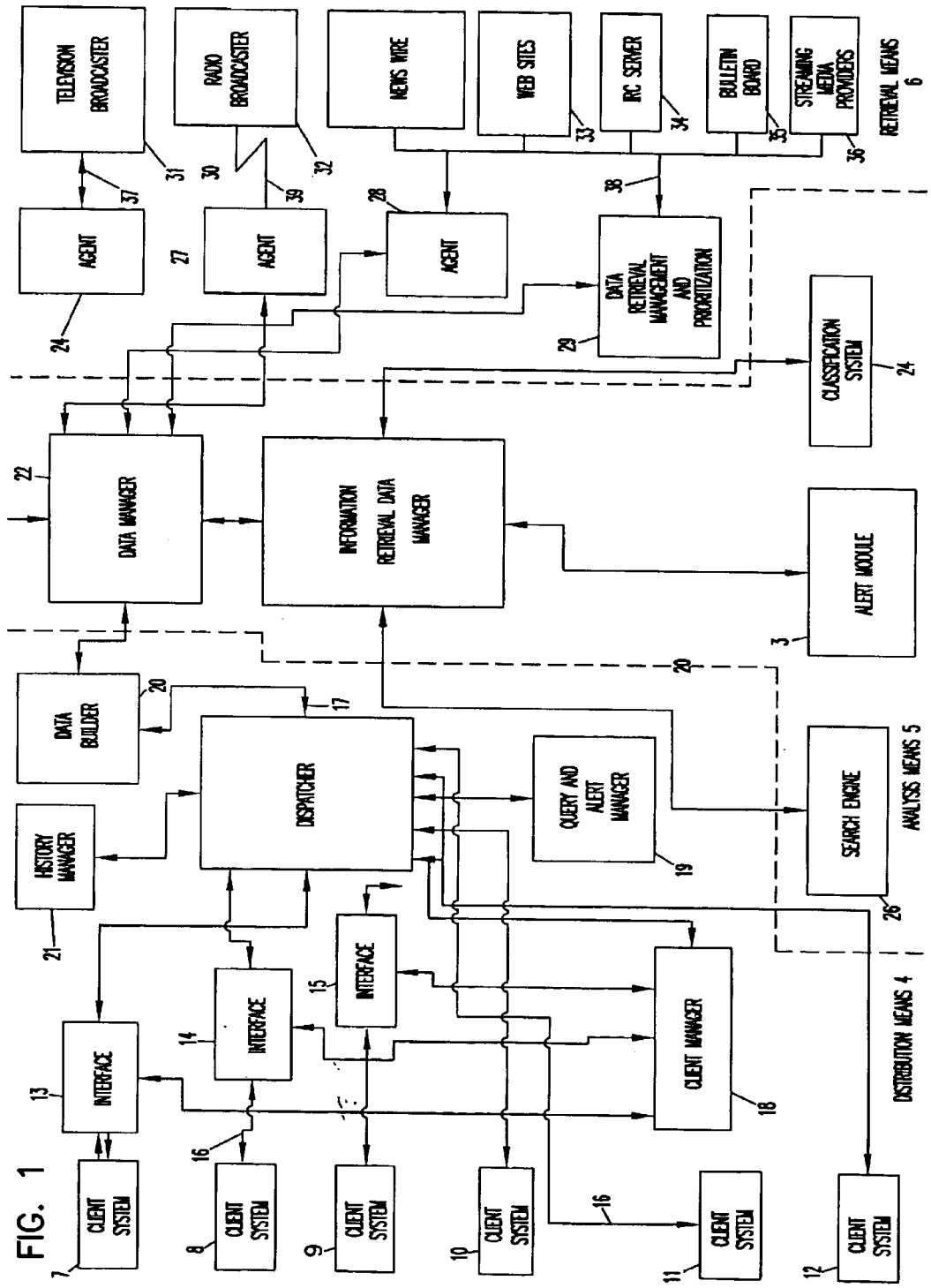
FIG. 1 is a simplified illustration of media monitor system, in accordance with a preferred embodiment of the present disclosure.

Referring to FIG. 1 describing media monitor system 1 in which real time search engine 26 and real time alert logic 3 operate, according to a preferred embodiment of the invention. System 1 comprising of distribution means 4, analysis means 5 and retrieval means 6. Real time alert logic also reffered to as real time alert module.

Alerts generated by system 1 are displayed in a form of a monitor media page.

Client systems 7, 8, 9, 10, 11 and 12 provide client queries and/or alert criteria to system 1. Client systems are coupled to system 1 via network 16 and a plurality of interfaces, such as interfaces 13, 14 and 15. For convenience of explanation it is assumed that client system 7 is a personal computer system, client system 8 is a cellular phone, client system 9 is a PDA, client system 10 is a set top box coupled to a digital television, client system 11 is adapted to receive electronic mail.

Accordingly, interfaces 13–15 are adapted to provide query results in various formats, according to various communication protocol, such as the TCP/IP protocol. For example, client system 8 can receive query results and alerts in WAP format. Usually, a client system receives a query result comprising of text, audio stream, video stream. Such a query result often comprises of a URL address, for allowing a client system to access desired information via a network such as the internet.

It is assumed that a client system can provide a client query and/or can update an alert criteria. System 1 accordingly provides said client system with a query result and/or an alert.

Conveniently, distribution means 4 comprising of interfaces 13–15, client manager 18, dispatcher 17, history manager 21, query and alert manager 19 and data builder 20. Client manager 18 holds client profiles. A client profile can indicate which queries were provided by the client system, at least one format in which either a query result and/or an alert is to be sent to a client system, a client identifier ID, and a list of alert criteria. Client Manager 18 manages user profiles and provides queries or alert criteria to alert engine 3 via query and alert manager 19. Each query/alert criteria is associated with said client ID. Conveniently, client manager 19 holds a table for mapping alerts to client systems.

Distribution means 4 interfaces between clients and the analysis means 5. Dispatcher 17 and interfaces 13–15 are adapted to receive client queries and/or alert criteria from client systems 7–8, to update client profiles and send said client queries/alert criteria to analysis means 5. Query results and/or alerts are generated by analysis means 5 and dispatched to client systems by distribution means 4.

Dispatcher 17 receives from client manager updated alert criteria and/or client queries and provides them to query and alert manager 19. Dispatcher 17 receives alerts and query results and in association with client manager 18 determines to which client system to send said alert and/or query result and in what format. Said alert and/or query result are provided to one of interfaces 13–15 and to the appropriate client systems. Dispatcher 17 receives query results and alerts from analysis system 5 via query and alert manager 19. In response to a reception of an alert or a query result, dispatcher 17 in association with client manager 18 determine which information to include in a query result or alert to be sent to a client system. Accordingly, a content object request is sent to data builder 20.

Data builder 20 accesses data manager 22 and provides dispatcher the requested information. For example, an alert can indicate that information source 30 provided at least one matching information packet that matches an alert criteria of client system 10. Dispatcher receives said alert and determines, in association with client manager 18 that the alert should contain additional information from the matching information source 30, such as a multimedia stream that was broadcasted by information source 30, whereas the matching information packets were driven from said multimedia stream.

Dispatcher sends data builder 20 a content object request to receive said multimedia stream. Said request usually determines the matching information ID and a content type/alert or query result format. Said multimedia stream is stored in a certain address within data manager 22, or in an external multimedia server (not shown). Said content object request to receive said address. Said address is provided to dispatcher 17 and via interface 13 and network 16 to client system 10. Eventually, said multimedia stream in displayed upon a screen of a digital television.

Conveniently, distribution means 4 maintains a list of distributor identifications ID, distributor type and user counter for each alert. Client manager 18 is adapted to handle client associated information such as client system profile, preferences, and alert criteria.

History manager 21 is adapted to maintain alert criteria and requests to update said criteria for client retrieval. History manager 21 receives requests to update an alert criteria from dispatcher 17 and stores said requests, for allowing a client system to view said requests.

Query and alert manager 19 routes client queries and alert criteria updates from dispatcher 17 and routes query results and alerts from analysis means 5 to dispatcher 17.

Retrieval means 13 comprising a plurality of agents or receptors, such as agents 24, 27, 28 and 29. Said agents are coupled to various information sources, such as information sources 30–36 via networks 37 and 38 or via media 39. Agents 24, 27, 28 and 29 are adapted to receive information streams from various information sources, such as television channel 30, radio channel 31, news provider 32, web sites 33, IRC servers 34, bulletin boards 35 and streaming media provider 36, and provide information packets to analysis means 5. For example, agent 24 receives television broadcasts or video streams via cable network 37 and convert the television broadcast or video stream to a stream of information packets. Agent 24 can comprise of a dedicated encoder, a device for extracting closed caption out of said video stream or picture recognition and analysis means. Agent 27 receives radio broadcasts, transmitted by radio channel 31 over a wireless media, and convert said transmitted audio stream to a stream on information packets. Agent 28 is coupled, via network 38 to news provider 32, web sites 33, IRC servers 34, bulletin boards 35 for retrieving information packets transmitted from said information sources via network 38. Retrieval means 6 further comprising of retrieval management and prioritization component 29 for prioritizing content sources and channels and for balancing the load between agents/receptors.

Real time alert module 3 is adapted to receive alert criteria from query and alert manager 19 to constantly match and alert criteria against portions of received information packets, said information packets provided by retrieval means 6. When an alert criteria is fulfilled, an alert indication is provided to query and alert manager 19. Conveniently, said alert indication comprising of a query ID and an information packet ID. Dispatcher 17 receives said alert indication accesses client manager 18 to determine which client system is to receive an alert, what additional information to provide said client system and in what format to send the alert to said client system. Accordingly, dispatcher sends a result object request to data builder 20. Data builder 20 accesses data manager 22, receives the additional information, provides said information to dispatcher 17, and provides an alert to a client system, via an interface and network 16.

Data Manager 22 is adapted to store received information packets, audio streams and video streams. Optionally, data manager 22 is further adapted to allow data clients to get notification on data events such as data changes, data expiration, etc. and is further adapted to allow data providers to register as such.

Real time alert module 3 allows to generate alerts in real time, in response to previously provided alert criteria and information packets being received in real time. Real time alert engine is adapted to support various alerts, such as Boolean alerts and best effort alerts.

Real time search engine 26 allows to generate query results in real time. Real time search engine 26 is adapted to support various searching techniques, such as Boolean search and best effort search.

Classification module 24 is adapted to dynamic classification of information streams/groups of information packets. Classification module 24 dynamically determines a topic of a channel, thus allowing searches and alerts based upon a topic an information stream.

Figure 2:
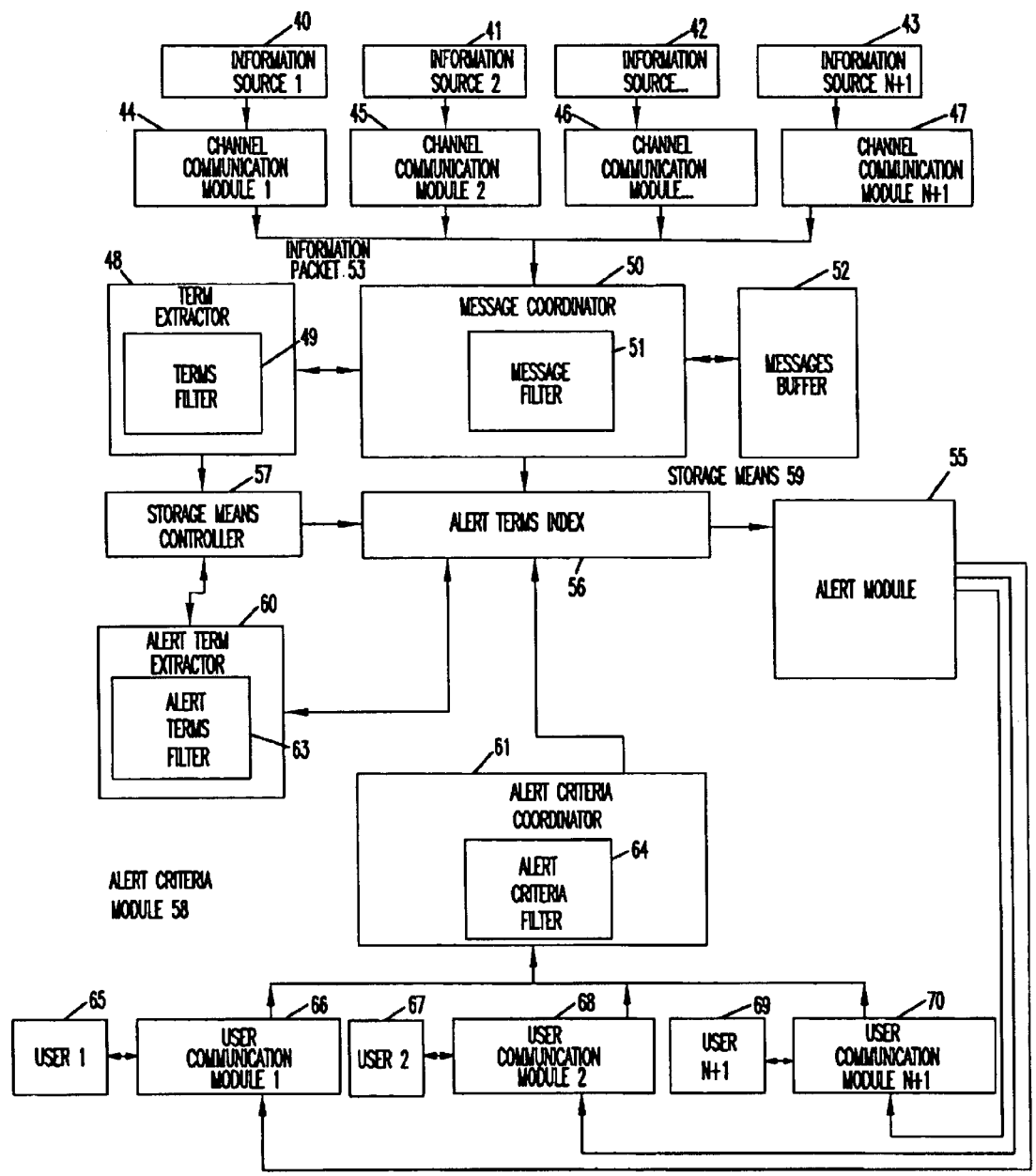
FIG. 2 is a simplified block diagram that illustrates an alert engine operations in association with related modules and data structures, in accordance with a preferred embodiment of the present disclosure.

Referring now to FIG. 2 illustrating a system 2 for real time alert. Although not part of the system 2, for the clarity of the disclosure only Information Sources 40, 41, 42, and 43 are shown connected to channel communication modules 44, 45, 46, and 47. For clarity of the disclosure FIG. 2 does not illustrate some portions of the distribution means 4, retrieval means 6 and analysis means 5 of FIG. 1.

FIG. 2 illustrates various optional modules/portions of system 2, such as, but not limited to message coordinator 50, message filter 51, terms filter 49, alert criteria term filter 63, alert criteria extractor 60.

Alert module 3 has information packet processor 53, storage means 59, storage means controller 57, alert module 55 and alert criteria module 58.

Information packet processor 53 having: message coordinator module 50 adapted to coordinate an handling of a plurality of information packets; message filter module 51 for filtering the plurality of information packets according to predefined rules; term extractor module 48 for performing parsing and stemming on said plurality of information packets; and terms filter 49 for excluding extracted terms according to predefined rules.

Storage means 59 have terms index 56 and messages buffer 52.

Alert criteria module 58 having: alert criteria coordinator module 61 to coordinate the processing of alert criteria; alert term extractor 60 to parse and stem incoming alert criteria in order to extract and process operative alert terms; alert terms filter 63 for excluding specific alert terms in a predefined manner. Alert criteria further comprising additional information such as information defining a relationship between alert terms, a client system identifier for determining which client provided said alert criteria, a weighing factor and a similarity threshold. Said additional information is not preprocessed but stored in storage means. Preferably, said additional information is stored in an alert criteria map.

Although no part of the Search Engine, for the clarity of the disclosure only, Users 65, 67, and 69 are shown connected to User Communication modules 66, 68, and 70.

In the preferred embodiment of the present disclosure, one information source may be a television channel that provided multimedia streams, that are later transformed into streams of information packets messages. It should be understood that in the following discussion of the present disclosure the general framework of television channels is used for purposes of description not limitation. Said search engine received text that is being either associated to the content of television channels or driven out of a multimedia stream provided by television stations. Text can be driven from a multimedia stream by various means such as special encoders, voice recognition means. Many television channels provide text in a format of clause caption. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages from the various channels are received through Channel communication modules 44, 45, 46, and 47 into real time alert system 3 and processed therein. Channel communication modules 44, 45, 46, and 47 build and transfer the messages to Messages Coordinator Module 50 for processing. The messages transferred consist of control data such as channel ID, Message ID, timestamp of the time of arrival, and information content such as a phrase, a sentence, a news item, a music item or a video item.

Messages Coordinator 50 coordinates the handling of the incoming messages, and provides processed messages to term extractor 48 and to messages buffer 52. Messages Buffer 52 is a data structure that temporarily holds the incoming messages. In the preferred embodiment of present disclosure Messages Buffer 52 is a cyclic buffer. Message Filter 51 filters messages according to user-defined rules. For example, messages with a specific channel ID or messages containing specific text might be blocked and discarded.

Term Extractor 49 receives the messages from Messages coordinator 48, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time. Terms Filter 49 passes the terms through a series of filters, which can change or discard specific terms. For example, Terms Filter 49 can discard stop-words, frequently used words, one-character words, user-defined words, system-defined words such as "a", "about", "else", "this", and the like.

Storage means controller 57 receiving the at least one extracted term, accesses alert terms index 56, determines whether an extracted term out of said at least one extracted term matches an alert term stored in alert terms index 56 and accordingly updates the matching term information stored within alert term index 56. Extracted terms that do not match any alert term are discarded. Storage means controller 57 also schedules and initiates periodically a process that removes information regarding matches between an alert criteria and between irrelevant or time-decayed terms from alert terms Index 56. Description of the process will be set forth hereunder.

Alert terms Index 56 consists of indexed alert terms and message identifiers that point to information relating to a reception extracted terms that match an alert term during a predetermined period of time. Alert terms Index 56 is designed to enable fast term indexing and deletion. The indexing is done per matching term, while deletion is done per message. When the message is discarded for becoming irrelevant or time-decayed, information regarding a reception of matching terms being extracted from said information packet is deleted from alert terms Index 56. Alert terms Index 56 is a means to realize real time alert regarding real time content.

According to one preferred embodiment of the invention, at least a portion of a request to create or update an alert criteria pass through alert criteria coordinator 61, alert criteria terms extractor 60 alert terms filter 63 and undergo preprocessing steps that are analogues to preprocessing steps of a massage. An alert criteria can contain several alert terms, and associated information such as a weighing factor, or a similarity threshold. Said associated information does not undergo said preprocessing steps.

Alert module 55, coupled to storage means 59, for processing at least a portion of the matching extracted term information to determine whether to issue an alert; and for issuing at least one alert to at least one client system, according to said determination. Conveniently, when a matching extracted term that matches an alert term is received, alert module 55 checks in which alert criteria said alert term is found, and processes matching extracted term information associated to said alert criteria to determine which alert criteria are fulfilled, and to which client systems to issue an alert.

An alert is send to the users 65, 67, and 69 via User communication modules 66, 68, and 70. User Communication modules 66, 68, and 70 communicate between the system 3 and the users 65, 67, and 69. For each user 65, 67, and 69, a new instance of communication module 66, 68, and 70 is activated. User communication modules 65, 67, and 69 transfer alert criteria updates initiated by the users to system 3 module and return results back to the users.

The operation of the system 3 will be described next. Information packets are extracted out of an incoming information stream from specific information sources such as television stations, radio stations by channel communication modules 44, 45, 46, and 47. The messages are structured, times-stamped and transferred to the operative modules of the Search Engine. The structured messages contain control data such as channel ID, message ID, time stamp indicative of the time of arrival and content information such as textual data. The messages transferred through Message Filter 51 which blocks specific messages according to predefined rules. For example, messages originating in particular channels or having specific text content or having particular characteristics could be discarded. The filtered messages are inserted into Messages Buffer 52 which is managed and synchronized by Messages Coordinator 50. Messages coordinator 50 operates in conjunction with Messages Buffer 52, which is designed to hold the messages to be retrieved for later processing. Messages Buffer 52 is a cyclic buffer. Incoming messages are inserted at one end of the Messages buffer 52 while retrieved from the other end. The messages are kept in the buffer for a predefined period of time. Time-decayed messages may be discarded. In other embodiments of the disclosure, other methods could be used to delete messages from Messages Buffer 52 such as deletion by predefined priorities. For example, messages from a specific low-priority channel could be discarded first. When a message is deleted from message buffer 52 information relating to the reception of extracted terms that were extracted from said messages are deleted from term index. Messages are provided by message coordinator 50 to Term Extractor 48. Term Extractor 48 performs message parsing, stemming (finding the lexicographic root) of the resulting tokens and extracts the tokens from the messages. The tokens are transferred through a series of Terms Filters 49. Terms Filters 49 can change or discard a token according to predefined parameters. For example, Terms Filters 49 can discard stop-words, one-letter words, frequently used words, user-predefined words and the like. Term Extractor 48 further attaches identifiers to the tokens such as channel ID, message ID and time of arrival. Finally, Term Extractor 48 dispatches the terms to storage means controller 57. Storage means controller 57 receives at least one extracted term and accesses alert terms hash 56 to determine whether an extracted term matches a term alert previously stored within alert terms index 56. If the answer is yes storage means controller 57 updated matching extracted term information, representative of a reception of a matching extracted term.

Conveniently a reception of a matching extracted term initiates a process of checking at least a portion of the matching extracted information to determine whether an alert criteria was fulfilled.

Alert terms Index 56 is a data structure containing entries indexed by extracted terms and matching extracted term information.

A more detailed description of the operations related to inserting terms and removing terms from alert terms index 56 will be set forth hereunder in association with the related drawing.

Alert criteria, and a request to update alert criteria are initiated by users. User communication modules 66, 68, and 70 transfer alert criteria from the user into the alert modules. An alert criteria hold one or more alert terms. Conveniently, the handling of an request to update or create an alert criteria by alert criteria module 58 is analogues to the handling of an incoming message, but portions of said request dare not preprocessed in the same manner. Alert criteria are filtered by alert criteria filter 64, and handled by alert criteria coordinator 61. Alert criteria coordinator 61 functions in respect to the incoming alert criteria in a like manner to Messages Coordinator 50 functions in respect to the incoming messages. Alert criteria coordinator 61 receives the queries from user communication modules 66, 68, and 70 and transfers them to the alert term extractor 60. Alert term extractor 60 parses the alert criteria and stems the resulting tokens. The tokens are filtered by a series of alert criteria filters 63, structured into alert-terms by the attachment of control information such as alert criteria Id and time-stamp.

Scoring, or ranking of channels to be returned as a result, is done using a model that computes the similarity between an alert criteria and a group of information packets provided by a single information source. Some of the parameters involved in computing the results are: Total amounts of terms in channel in the predefined time interval, number of matching terms in the channel in the predefined time interval, total number of channels searched in the predefined time interval, elapsed time since the last appearance of the matching term in the channel in the predefined time interval and matching terms position in the channel. Additional factors for the score: terms in proximity to matching term, part of speech of matching terms, relevant term frequency and importance in the language of the channel.

The parameters further enable alert module 55 to rank the resulting channels, and to generate a similarity rank, to be further compared to an alert similarity threshold, in addition to standard ranking methods by the time parameter as well by giving more weight to phrases than to the collection of single words.

Figure 3:
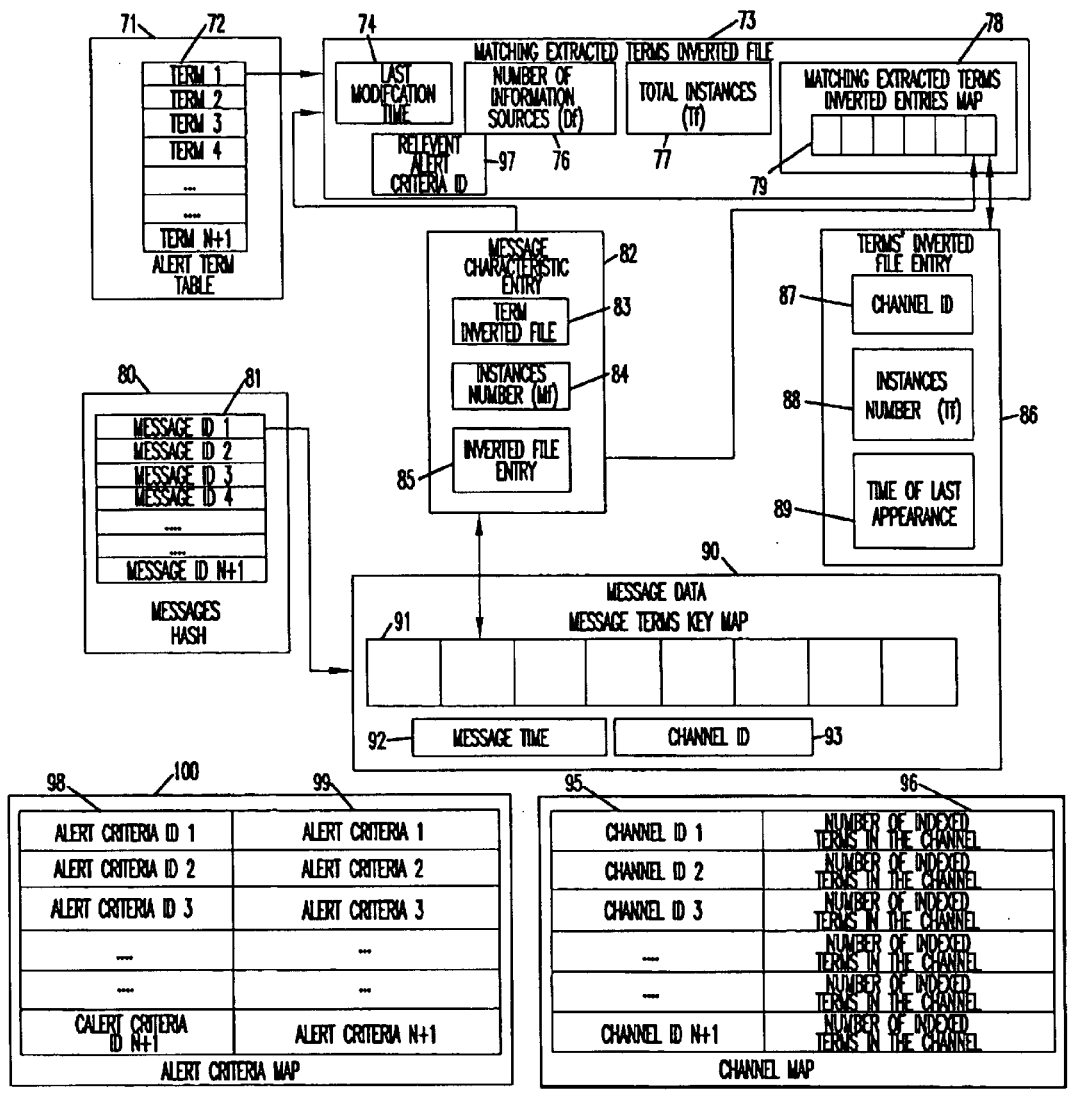
FIG. 3 is a simplified block diagram that illustrates the structure of the alerts Index tables,in accordance with a preferred embodiment of FIG. 4 is a simplified block diagram that illustrates a real time search engine operations in association with related modules and data structures, in accordance with a preferred embodiment of the present disclosure.

Referring now to FIG. 3 that illustrates the structure of the alert terms index 56 tables. The alert terms Index consists of two main units: the alert terms hash 71 and the messages hash 80. Additionally alert terms Index contains the Channel Map unit 94.

Alert terms hash 71 comprises the alert term table 72 and the associated extracted matching terms Inverted File 73. The alert term Hash 71 comprises of entries whose keys are terms. Therefore, alert term Hash 71 provides fast access to the entries by using terms as access keys. The said structure also provides for fast insertion of terms into the table. Alert term table 72 stores a plurality of alert terms, provided by client systems. Extracted matching terms inverted file 73 stores matching extracted terms information, representative of a reception of extracted terms that match alert terms during a predetermined period of time. Said extracted terms are also referred to a extracted matching terms.

The matching extracted terms inverted file 73 comprises of a sorted list of matching extracted terms inverted entries map 78 and at least one of the following files: (a) a total number of references (Total Instances) 77 to the matching extracted term in all the messages currently stored in Messages Buffer 52 of FIG. 2, (b) the modification time of the extracted matching term (Last Modification Time) 74, or (c) a number of channels that contain the extracted matching term 76. Each entry, such as entry 786 in extracted matching terms inverted entries map 78 is keyed by the channel ID 87 and has the number of references (Instances No) 88 to the extracted matching term in that channel and the time of the last appearance of the extracted matching term in the channel (Time of Last Appearance) 89. The number of references that are added to the Total Instances 77 could be used to determine the channel's relevance to a specific alert criteria.

Messages Hash 80 indexed by Message ID 81 in order to provide fast deletion of term's references by message. Messages Hash 80 comprises Message ID table 81 and the associated Message Data table 90. Each entry in Message Data table 90 contains information about one message and pointed to by a Message Hash entry 81. Message Data table 90 consists of (a) the channel ID 93 (b) message time 92, and (c) Message Terms Keyed Map 91. The Message Terms Keyed Map 91 is a sorted list of Message Characteristics Entries 82. A pointer 83 keys each entry, which is unique to each term. Therefore, a Message Characteristics Entry 82 can be found easily by a specific term. Message Characteristics Entry 82 contains the following information: (a) the number of times the related extracted matching term was referred to in the relevant message (Instances No) 84, and (b) a pointer to the related Inverted File Entry 85.

The Channel Map 94 is a list sorted by channel IDs 95. For each channel ID 95, Channel Map 94 holds the total number of currently indexed extracted matching terms that belong to the channel 96. In the preferred embodiment of the present disclosure, said total number relates to the number of extracted matching terms after filtering. In a different embodiment of the present disclosure, the total number could relate to the number of extracted matching terms before filtering or to the average of both values.

The alert criteria map 100 is a list sorted by a criteria IDs 98. For each alert ID 98, alert criteria map 100 holds an alert criteria. An alert criteria can hold more than a single alert term, a weighing factor given to each alert term of the alert criteria, a similarity factor and the alert term ID of each of the alert terms of said alert criteria, for allowing to process matching extracted term information representative of a reception of terms of the alert criteria. Alert criteria map 100 is built and updated according to requests issued by client systems.

The operations supported by the alert terms index 56 of FIG. 2 will be described next. Alert terms index 56 of FIG. 2 supports three modes of operation: (1) an update, a deletion or creation of an alert criteria, (2) extracted matching information deletion by message ID, and (3) extracted matching term information deletion by the garbage collection process.

An alert criteria is updated, deleted or created by storage means controller 57, in response to a reception of a request from a client system. The whole update criteria is given an alert criteria ID, said ID and the alert criteria are stored in alert criteria map 100. Each alert term of the alert criteria is indexed and inserted to alert terms index 56.

Storage means controller 57 handles an update of matching extracted information when an extracted term that matches an alert term is received. Accordingly, the following sequence of steps is performed:

One) the alert Term 72 to extracted matching Terms Inverted File 73 link is accessed or created. A pointer to extracted matching Terms Inverted File (invertedFilePtr) is saved.

Two) the Total Instances 77 member's value in extracted matching Terms Inverted File 73 pointed at by invertedFilePtr is increased by one.

Three) the Last Modification Time 74 member in extracted matching Terms Inverted File 73 pointed at by invertedFilePtr is updated.

Four) the entry for channel Id 87 in extracted matching Terms Inverted Entries Map 79 is accessed or created. A pointer to the entry is saved as invertedFileEntryPtr.

Five) the value of Instances No 88 member in the entry pointed at by invertedFileEntryPtr is increased by one.

Six) the appropriate Message Data is accessed or created in Message Hash 80. A pointer to the entry is saved as messageData.

Seven) the Message Characteristic Entry 82 in Message Data 90/Message Terms Keyed Map 91 is accessed by invertedFilePtr or created. A pointer to the entry is saved as messageCharac.

Eight) in the entry pointed at by messageCharac the value of Instances Number 84 member is increased by one.

Nine) in the entry pointed at by messageCharac, the invertedFileEntry pointer is set to point at invertedFileEntryPtr.

Ten) in the Message Data 90, the Message Time 92 member is updated.

Eleven) in the Message Data 90 the channel ID 93 member is updated.

A deletion of extracted matching term information representative of a reception of matching extracted terms extracted from a message occurs when a message is deleted. A message can be deleted when the Messages Buffer 52 of FIG. 2 is full or a predetermined time interval indicative of the period a message should be kept in the buffer 52 has been completed. For extracted matching term information deletion by Message Id the following sequence of steps is performed:

One) the appropriate Message Terms Keyed Map 91 is obtained from Messages Hash 80.

Two) for each Message Characteristics Entry 82 that points to extracted matching Terms Inverted File 73

Three) the pointed extracted matching Terms Inverted File 73 is accessed and Total Instances 77 member's value is decreased by the Instances No 84 member's value in Message Characteristic Entry 82.

Four) the Term Inverted Entry 86 is accessed and the Instance Number 88 value is decreased by Message Characteristic Entry's local Instances No member 84 value.

Five) Message Characteristic Entry 82 is deleted. Six) steps 'c' through 'e' are repeated until Message Terms Keyed Map 91 is empty.

Seven) the Message Id 81/Message Terms Keyed Map 91 link is deleted.

Deleting an extracted matching term information not via Message Id 81 is done periodically by the garbage collecting process. The deletion is performed if the extracted matching term's last modification time occurred before a specific point in time in the past which implies that there are currently no messages that the specific extracted matching term refers to or that the extracted matching term's Total Instances 77 member's value equals zero. When a extracted matching term is found that satisfies the above conditions a simple deletion of the alert Term 72 to extracted matching Terms Inverted File 73 link is performed.

According to another preferred embodiment of the invention, a single data structure can support both real time searches and real time alerts. Terms Index Table will store alert criteria and received terms. An alert criteria will not be deleted from terms index unless a client system requested such a deletion. Each entry of the table will have an additional field, for identifying the indexed term as at least a portion of an alert criteria or as a received extracted term. According to said embodiment, when storage means controller 57 receives an extracted term is determines whether said extracted term matchers matches an alert term, and if the answer is 'no' said term is indexed in alert terms hash 56, with an indication that it is not an alert term. Said extracted term can be deleted from alert terms module 56 by message ID or by a garbage collecting process.

Figure 6:
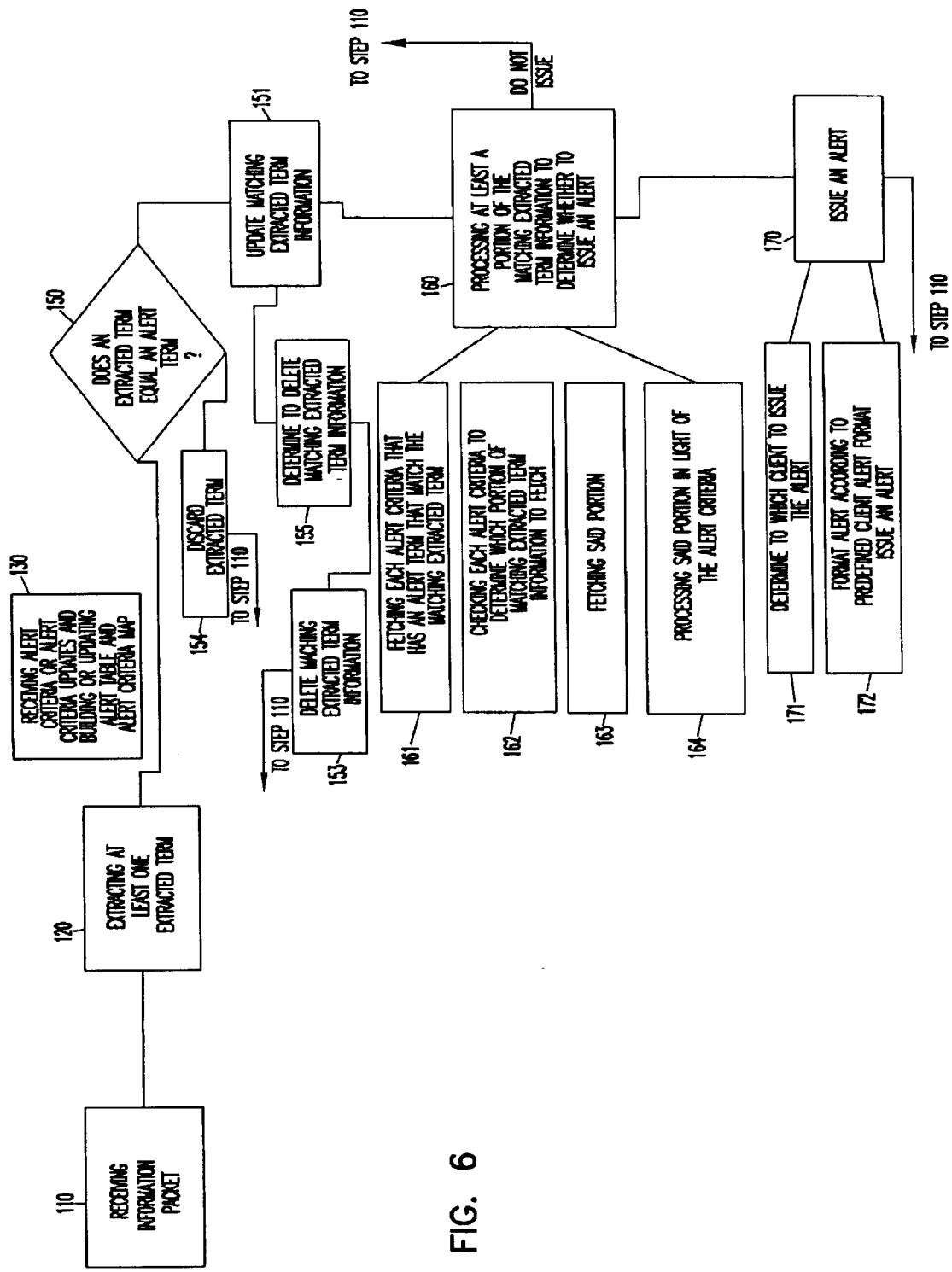
Figure 7:
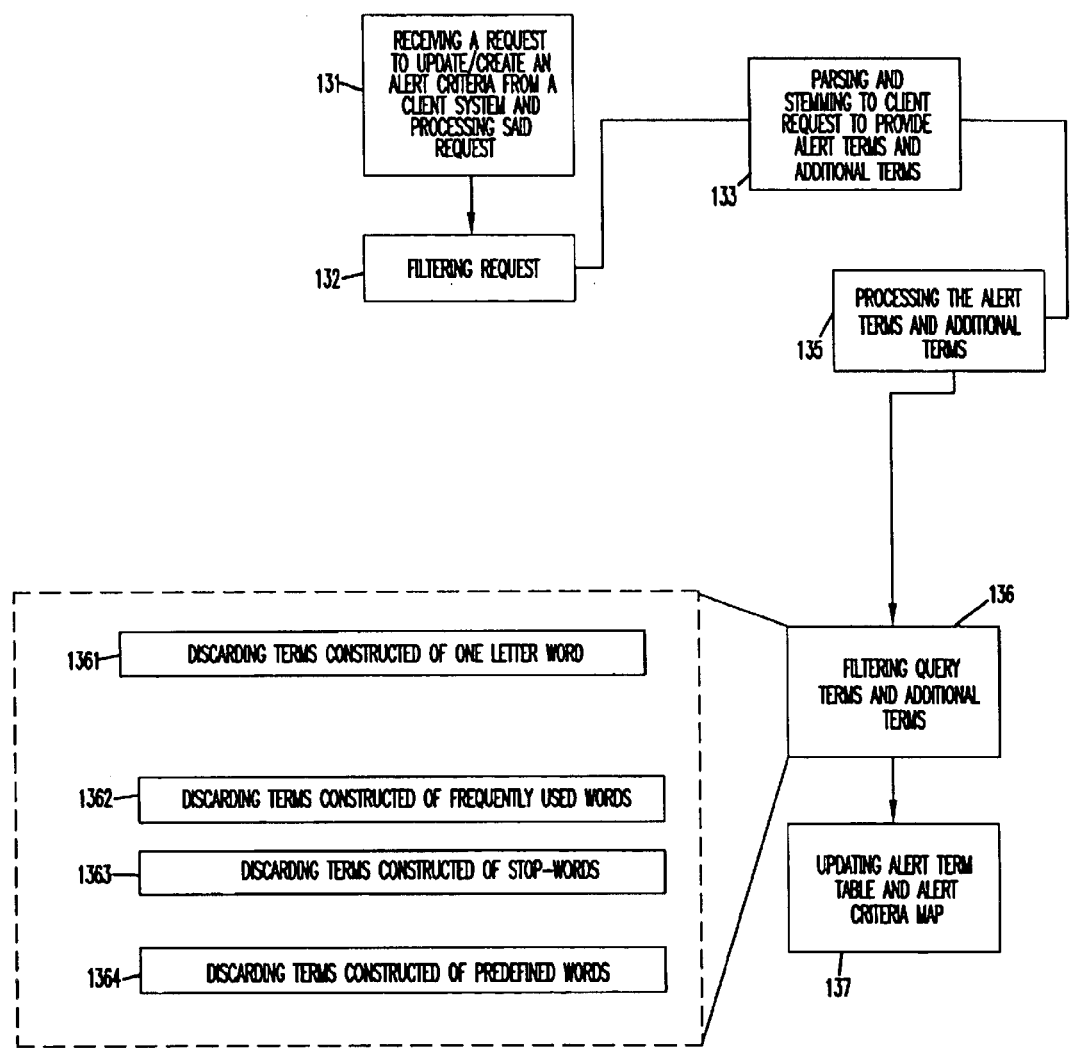

Referring to FIGS. 6–8 illustrating method 101 for real time alert, method 101 comprising of the following steps:

Step 110 of receiving an information packet; said information packets either provided by an information source or representative of a portion of a received signal provided by an information source.

Step 110 is followed by step 120 of extracting at least one extracted term out of the information packet.

Step 120 is followed by step 150 of determining whether an extracted term out of said at least one extracted term matches an alert term, and accordingly either discarding said extracted term (step 154) or updating (step 151) a matching term information representative of a reception of matching extracted terms, an alert criteria comprising of at least one alert term, said matching term information being stored in a storage means that is configured to allow fast insertion and fast deletion of content. Conveniently, step 150 is preceded by step 130 of receiving alert criteria from client systems and processing said criteria to update or create an entry in alert term table 72 and alert criteria map 101. Conveniently step 154 is followed by step 110.

Step 151 is followed by steps 160 and 155. Step 160 of processing at least a portion of the matching extracted term information to determine whether to issue an alert.

Conveniently, said processing step can implement complex matching techniques, Boolean matching techniques, probabilistic matching techniques; fuzzy matching techniques; proximity matching techniques; and vector based matching techniques. Said process can be based upon an analysis of the matching extracted term information representative of a reception of matching extracted terms from a single information source, said information source being identified by a channel ID. Conveniently, a portion of the matching extracted term information that is processed, said portion is determined by an alert criteria. Preferably, said alert criteria comprising of the at least matching extracted term received in step 110. If, for example, a matching extracted term is a part of an alert criteria, said alert criteria further comprising an additional alert term, a portion of matching extracted term information representative of both alert terms is processed in order to determine whether to issue an alert.

Step 160 is followed by step 170 of issuing at least one alert to at least one client system, according to said determination.

Step 155 of determining to delete a message and accordingly to delete matching extracted term information representative of a reception of matching extracted terms extracted from said information packet.

Conveniently, steps 110 and 120 further comprise additional preprocessing steps, such as:

step 111 o processing the plurality of information packets by adding control data to said information packets. The control data comprising of information packet identification, information source identification and time of arrival. Step 112 of filtering the plurality of information packets. Step 113 of parsing and stemming the plurality of information packets. Step 124 of processing said extracted terms by adding control information to said extracted terms. Step 125 of filtering the extracted terms to generate filtered extracted terms. Preferably, step 125 further comprising at least one of the following steps: step 1151 of discarding said terms constructed of one-letter words; step 1252 of discarding said terms constructed of frequently used words; step 1253 of discarding said terms constructed of stop-words and step 1254 of discarding said terms constructed of predefined words.

Step 151 of updating a matching extracted term information conveniently involves the steps of storing the information packet and related control data in the storage means; and linking between the stored information packet and the matching extracted term information. Preferably, step 151 comprising the following steps: step 1512 of increasing a value of total instances in a matching extracted terms inverted file associated to said matching extracted term; step 1513 of updating a value of last modification time in said accordingly updating a matching extracted terms inverted file; step 1514 of inserting an information source identification, said information source provided the extracted term, to a matching extracted terms inverted entry map table in said terms inverted file; step 1515 of increasing a value of instances number in said matching extracted inverted entry map table associated with said information source identification in said matching extracted terms inverted file; step 1516 of inserting information packet data in a messages hash table; step 1517 of inserting the matching extracted term from said information packet to a messages data table; step 1518 of increasing a value of instances in said messages data table by one; step 1519 of updating a value of message time in said messages data table; and step 1510 of updating a value of information source identification in said message data table.

Step 151 is followed by step 153 of deleting from the matching extracted terms index data structure the matching extracted term information representative of reception of matching extracted term extracted from an information. Said deletion occurs either after a message from which said term was expired is stored in the message buffer for a predetermined period of time. Said matching extracted term information can also be deleted as a result of a garbage collection process, said process is based upon a deletion of matching extracted terms that are not mentioned during a certain period.

Preferably, step 153 comprising the steps of: step 1531 of receiving an information packet identification, whereas the matching extracted term information representative of reception of matching extracted terms extracted from the information packets are to be deleted; step 1532 of reading the information packet identification from the messages hash table in said alert terms index data structure; step 1532 of obtaining relevant entries of said extracted terms belonging to said information packet in said messages data; step 1533 of accessing said matching extracted terms inverted file for each said terms entry pointed to said matching extracted terms inverted file; and step 1534 of decreasing a value of said total instances by a value of said instances number for each said terms entry pointed to said matching extracted terms inverted file. Step 153 further comprises of step 1535 of deleting an matching extracted term information by a garbage collection process.

Conveniently, step 130 comprising step 131 of receiving a request to update or create an alert criteria and processing the request by adding control data. Step 130 is followed by step 132 of filtering the request. Said filtering involves excluding said requests generated from predefined client systems. Step 130 is also followed by step 133 of parsing and stemming the alert criteria to generate alert terms and additional terms. Additional terms can define a relationship between alert terms, a weight factor associated to the alert terms, a similarity threshold and to indicate which client system are to receive an alert when said criteria is matched. Step 134 is followed by step 135 of processing the alert terms and additional information by adding relevant control information. Step 135 is followed by step 136 of filtering said alert terms and additional terms. Step 136 further comprising of at least one of the following steps: step 1361 of discarding said alert terms constructed of one-letter words; step 1362 of discarding said alert terms constructed of frequently used words; step 1363 of discarding said alert terms constructed of stop-words; and step 1364 of discarding said alert terms constructed of predefined words. Step 136 is followed by step 137 of storing said alert terms in a alert term index data structure for a period that is shorter than a predefined period of time or until an alert criteria removal request is received from a user.

Conveniently step 160 comprising step 161 of fetching each alert criteria that have an alert term that matches a matching extracted term that was received at step 110. Step 162 of checking each alert criteria to determine which portion of matching terms extracted information to fetch. Step 163 of fetching said portion and step 164 of processing said portion, in light of the alert criteria to determine whether to issue an alert.

Conveniently, step 164 is based upon a parameter out of a group consisting of: a total amount of extracted terms provided by an information source in a predefined time interval; an elapsed time since the extracted term was provided by the information source in said predefined time interval; and an extracted term position in the information source.

Conveniently, step 164 involves computing a similarity between an alert criteria and information indicating a reception of a group of information packets. The similarity reflects at least one of the following parameters: a total amounts of extracted terms being received from at least one information source during a predefined time interval; a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term; a part of speech of a matching extracted term; and a matching extracted term frequency and importance in a language of the information source. Said similarity can be compared to a predefined similarity threshold, in order to determine whether to send an alert to a client system. Preferably, the group of at least one information packet comprising of at least one information packet received from a single information source.

Step 170 comprising step 171 of determining to which client system to send an alert. Conveniently step 171 is followed by step 172 of determining a format of an alert to be sent to a client system, according to a predefined client system format and formatting the alert according to said client system format. Preferably, the predetermined client format selected from a group consisting of: HTML format; WAP format; PDA compatible format; Digital television compatible format; electronic mail format; and multimedia stream format.

Preferably, an alert comprising of at least one field selected from a group consisting of: an information source identifier field, for identifying an information source that either provided a matching extracted packer or for identifying an information source that provided a received signal, whereas a portion of said received signal being represented in an information packet from which the extracted term was extracted; a link field, for allowing the client system to be linked to the information source or for allowing the client system to receive additional information from said information source; and an information source category identification, identifying a category of information source that provided the matching extracted term. Said additional information is selected from a group consisting of: a multimedia stream originated by said information source; a stream of information packets originated by said information source; a multimedia stream associated to the information packet from which the extracted term was extracted; a stream of information packets, comprising the extracted term.

Conveniently, a client system is configured to generate a unique information source category indication in response to a reception of said information source category identification and to generate a unique information source indication in response to a reception of said information source identification.

Figure 4:
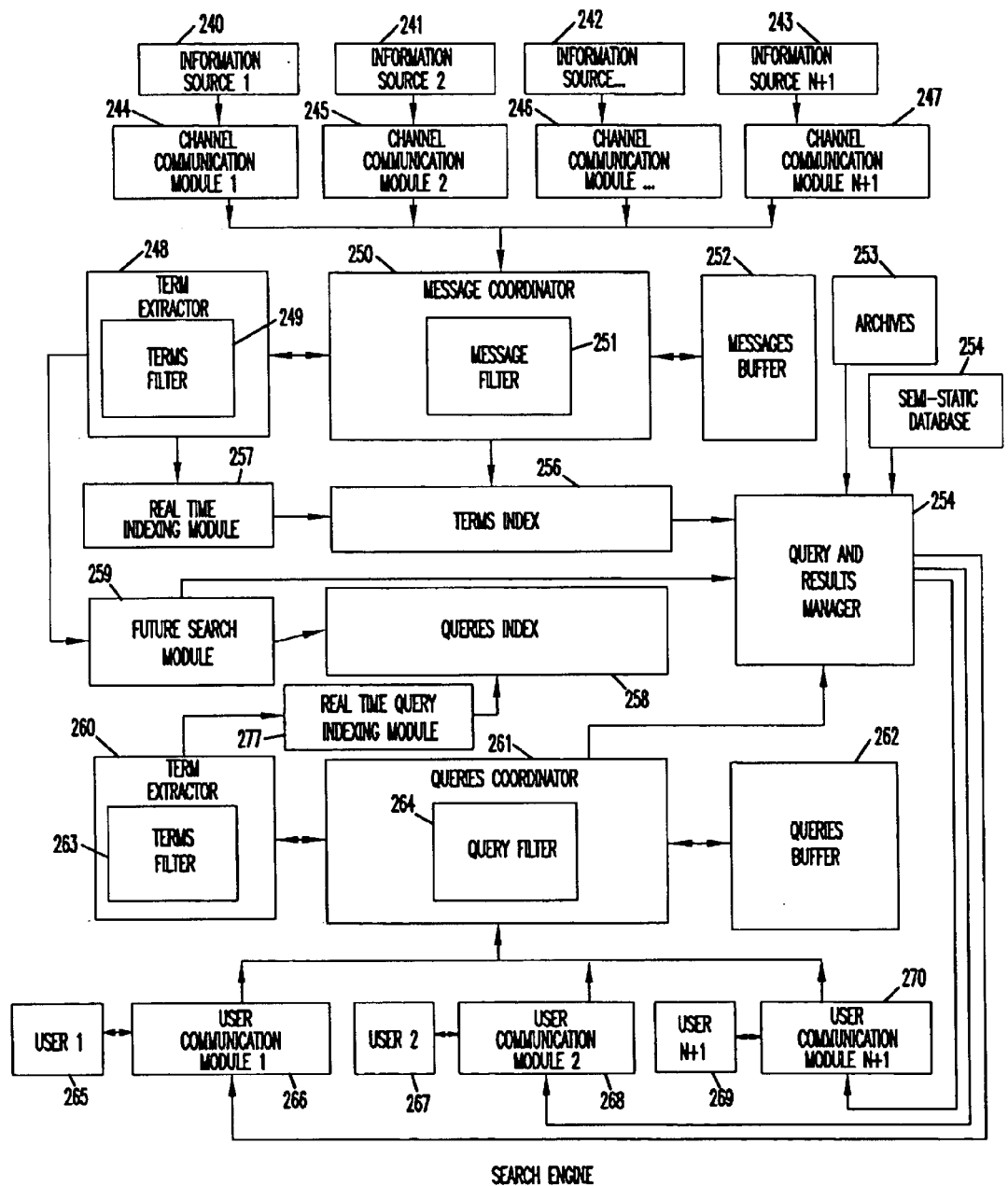

Referring now to FIG. 4 where the various software modules and data structures necessary for the operation of the Search Engine are shown. Although not part of the Search Engine, for the clarity of the disclosure only Information Sources 40, 41, 42, and 43 are shown connected to channel communication modules 44, 45, 46, and 47. For clarity of the disclosure FIG. 4 does not illustrate some portions of the distribution means 4, retrieval means 6 and analysis means 5 of FIG. 1.

FIG. 4 illustrates various optional modules/portions of search engine 26, such as, but not limited to, query index 258, real time query indexing module 277, archive search module 253, semi-static database search module 254, query coordinator 261 query filter 264, message coordinator 250, message filter 251, terms filters 249 and 263. Search engine 26 has: Message Coordinator module 250, Message Filter module 251, Messages Buffer 252, Term Extractor modules 248 and 260 Terms Filter modules 249 and 263, Real Time Search modules 257 and 277, Terms Index 256, future search module 259 for allowing a generation of real time alerts to a client system, queries Index 258, query and results manager 255 user communication modules 266, 268, and 270, queries coordinator 261, query filter module 264, archive search module 253, and semi-static database search module 254. Although no part of the Search Engine, for the clarity of the disclosure only, Users 265, 267, and 269 are shown connected to User Communication modules 266, 268, and 270. Query and results manager 255 matches query results to terms index 256 to generate query results. Query and results manager 255 matches alert criteria provided by future search module 259 to the content of terms index 256, future search module also referred to as alert module 259. In the preferred embodiment of the present disclosure, one information source may be a television channel that provided multimedia streams, that are later transformed into streams of information packets messages. It should be understood that in the following discussion of the present disclosure the general framework of television channels is used for purposes of description not limitation. Said search engine received text that is being either associated to the content of television channels or driven out of a multimedia stream provided by television stations. Text can be driven from a multimedia stream by various means such as special encoders, voice recognition means. Many television channels provide text in a format of clause caption. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages from the various channels are received through Channel communication modules 244, 245, 246, and 247 into the Search Engine module and processed therein. Channel communication modules 244, 245, 246, and 247 build and transfer the messages to Messages Coordinator Module 250 for processing. The messages transferred consist of control data such as channel ID, Message ID, timestamp of the time of arrival, and information content such as a phrase, a sentence, a news item, a music item or a video item.

Messages Coordinator 250 coordinates the handling of the incoming messages, and provides processed messages to term extractor 248 and to messages buffer 252. Messages Buffer 252 is a data structure that temporarily holds the incoming messages. In the preferred embodiment of present disclosure Messages Buffer 252 is a cyclic buffer. Message Filter 251 filters messages according to user-defined rules. For example, messages with a specific channel ID or messages containing specific text might be blocked and discarded.

Term Extractor 249 receives the messages from Messages coordinator 248, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time. Terms Filter 249 passes the terms through a series of filters, which can change or discard specific terms. For example, Terms Filter 249 can discard stop-words, frequently used words, one-character words, user-defined words, system-defined words such as "a", "about", "else", "this", and the like.

Real Time Indexing Module 257 accepts and stores the terms into Terms Index 256. Real Time Indexing module 257 also schedules and initiates periodically a process that removes irrelevant or time-decayed terms from Terms Index 256. Description of the process will be set forth hereunder.

Terms Index 256 consists of indexed terms and message identifiers that point to information relating to a reception of said messages and indexed terms during a predetermined period of time. Terms Index 256 is designed to enable fast term indexing and deletion. The indexing is done per term, while deletion is done per message. When the message is discarded for becoming irrelevant or time-decayed, all terms that refer to this message are deleted from Terms Index 256. Terms Index 256 is a means to realize real time search of real time content that is one of the search capabilities of the Search Engine module.

Alert module 259 functions in conjunction with Queries Index 258. Unlike real time Indexing module 257, alert module 259 matches incoming terms from the message stream against a database of more or less static queries. Therefore, alert module 259 has the ability to search for a term that is relevant to a query that was initiated at some point in time in the past as long as the relevant query is kept in the Queries Index 258. Alert module 259 enables the return of query results during a predefined time frame that begins at the query's arrival time.

Queries Index 258 holds queries for a predefined time frame in order to provide the means to alert module 259 to match terms of queries against the terms of the incoming messages. Queries Index 258 enables to return future results to queries.

According to one preferred embodiment of the invention, queries are inserted into queries Index 258 by queries coordinator 61. According to another preferred embodiment of the invention said queries also pass query terms extractor 260 and real time query indexing module 260, and undergo preprocessing steps that are analogues to preprocessing steps of a massage. Queries can contain several terms. Therefore, the relevant control information associated with each query such as query ID, timestamp and the like is indexed against all the terms of the query.

Query and Results Manager module 255 handles the queries and provides return of results to the queries by establishing a unified result from all the result sources except from Future search module 259. Result sources are the following: (a) search in Real Time Indexing module 257, (b) search in the Semi-static database by semi-static database search module 254, and (c) search in the Archive database by archive search module 253. The results from future search module 259 are passed through the Query and Results Manager 255 that sends the results on to the users 265, 267, and 269 via User communication modules 266, 268, and 270. Typically, a result consists of a sorted list of channel IDs and a score for each channel that mirrors a channel/query match. User Communication modules 266, 268, and 270 communicate between the Search Engine module and the users 265, 267, and 269. For each user 265, 267, and 269, a new instance of communication module 266, 268, and 270 is activated. User communication modules 265, 267, and 269 transfer queries initiated by the users to the Search Engine module and return results back to the users.

When a complex search is performed, query and search manager 255 analyses information regarding a various receptions of information packet, said information packets originating from a single information source.

Queries Coordinator 261 functioning similarly to Messages Coordinator 250 only with queries instead of messages. Queries Coordinator 261 receives queries from user communication modules 266, 268, and 270 and inserts the queries into the Queries Buffer 262. Upon a request from Query and Results Manager 255 Queries Coordinator 261 fetches one query from queries buffer 262 and passes it via Terms Filter 263 to Term Extractor 260. The extracted terms of the query are inserted by real time query indexing module 277 into Queries Index 258.

According to one preferred embodiment of the invention, queries Buffer 262 holds the queries in the same manner as the messages are held in the Messages Buffer 252. Queries Buffer 262 is a data structure that temporarily holds the incoming queries. In the preferred embodiment of present disclosure Queries Buffer 262 is a cyclic buffer.

According to another preferred embodiment of the invention said query buffer holds a plurality of alerts criteria, each alert criteria is stored in said buffer until a client that provided said alert criteria deletes said alert criteria.

Archive search module 253 acts on the archived data files of a channel by indexing the data and by returning results according to the indexed data. The archived data files through Archive search module 253 are a result source for the Query and Results Manager 255.

The Semi-static database search module 254 acts on the semi-static database that is an index, holding semi-static channel information such as channel ID, channel description, name, topic, and keywords. The database described "semi-static", as the information therein is structured (i.e.—said information is associated to information fields), is relatively small and changes infrequently. Semi-static database via semi-static database search module 254 is a result source for the Query and Results Manager 255.

It will be appreciated that other forms of search could be contemplated in other embodiments such as thesaurus-mode search or historical-mode search. Therefore, the above description should not be interpreted as a limitation to the present disclosure.

The operation of the Search Engine module will be described next. Information packets are extracted out of an incoming information stream from specific information sources by channel communication modules 244, 245, 246, and 247. The messages are structured, times-stamped and transferred to the operative modules of the Search Engine. The structured messages contain control data such as channel ID, message ID, time stamp indicative of the time of arrival and content information such as textual data. The messages transferred through Message Filter 251 which blocks specific messages according to predefined rules. For example, messages originating in particular channels or having specific text content or having particular characteristics could be discarded. The filtered messages are inserted into Messages Buffer 252 which is managed and synchronized by Messages Coordinator 250. Messages coordinator 250 operates in conjunction with Messages Buffer 252, which is designed to hold the messages to be retrieved for later processing. Messages Buffer 252 is a cyclic buffer. Incoming messages are inserted at one end of the Messages buffer 252 while retrieved from the other end. The messages are kept in the buffer for a predefined period of time. Time-decayed messages may be discarded. In other embodiments of the disclosure, other methods could be used to delete messages from Messages Buffer 252 such as deletion by predefined priorities. For example, messages from a specific low-priority channel could be discarded first. When a message is deleted from message buffer 252 information relating to the reception of extracted terms that were extracted from said messages are deleted from term index. Messages are provided by message coordinator 250 to Term Extractor 248. Term Extractor 248 performs message parsing, stemming (finding the lexicographic root) of the resulting tokens and extracts the tokens from the messages. The tokens are transferred through a series of Terms Filters 249. Terms Filters 249 can change or discard a token according to predefined parameters. For example, Terms Filters 249 can discard stop-words, one-letter words, frequently used words, user-predefined words and the like.

The tokens are structured into operative terms to be used by other Search Engine modules after Term Extractor 248 attaches identifiers to the tokens such as channel ID, message ID and time of arrival. Finally, Term Extractor 248 dispatches the terms to real-time Indexing module 257.

The purpose of Real-time Indexing module 257 is to provide a search capability of text received in the close past. Real Time Indexing module 257 receives the terms from Term Extractor 248 and stores the operative terms into Term Index 256 which is a dynamic data structure designed to cope with the requirement for fast indexing of terms and for fast deletion of all references to terms related to a specific message. In addition, real-time Indexing module 257 performs a periodic scan for non-used terms in Terms Index 256. Non-used terms are defined as terms that are not referenced for a predefined period of time. Periodically, a garbage collection process is initiated by real-time Indexing module 257 in order to delete the non-used terms.

The search-related element of Terms Index 256 is a data structure containing entries indexed by terms and holding the terms related information such ass a channel ID. As a result, fast insertion and indexing of terms is accomplished.

A more detailed description of the operations related to inserting terms and removing terms from Terms Index 256 will be set forth hereunder in association with the related drawing.

Queries are initiated by users. User communication modules 266, 268, and 270 transfer the queries from the user into the Search Engine modules. Queries hold one or more terms. Conveniently, the handling of a query by the Search Engine modules is analogues to the handling of an incoming message. Queries are filtered by Query Filter 264, and handled by Queries Coordinator 261. Queries Coordinator 61 functions in respect to the incoming queries in a like manner to Messages Coordinator 250 functions in respect to the incoming messages. Queries Coordinator 261 receives the queries from user communication modules 266, 268, and 270 and transfers the queries to the Term Extractor 260. Term Extractor 260 parses the queries and stems the resulting tokens. The tokens are filtered by a series of Terms Filters 63, structured into query-terms by the attachment of control information such as query Id and time-stamp and returned to Queries Coordinator 261 to be inserted into Queries Index 258 in order to be matched later against the operative terms in Terms index 256.

Queries Index 258 holds query-terms for a predefined period of time to enable queries to be matched against the stream of incoming message terms. Queries index 258 thus provides the capability to collect future results to queries. The above mentioned capability is accomplished in conjunction with the Future Search module 259.

Future Search module 259 operates in conjunction with the Queries Index 258 by matching terms from incoming stream of messages against a database of relatively static queries. Said data base can hold alert criteria, and system I can dispatch an alert to a client system when an alert criteria is matched. Subsequently a query that was initiated in the past can be matched against newly inserted terms as long as the query is kept in the Queries Index 258. This type of search is defined as the "future search mode" in contrast to the "real-time search-mode".

Query and Results Manager 255 handles the query-terms and provides query results by fetching query-terms from Queries Index 258 through Queries Coordinator 261, dispatches the query-terms to the different result sources, collects the results and builds a unified result to be sent back to the user that initiated the original query.

There are three operative result sources/three matching modes: (a) Real-time search, (b) Archive search, and (c) semi-static database search. Although the Future search functions separately from the other result sources in a different embodiment of the present disclosure future search results may be unified with the search results.

Query and Results Manager 255 establishes a unified result from all result sources (excluding future-search-mode). Query and Result Manager 255 sends the results to the users structured as sorted lists of channel IDs and a score for each channel representing a channel/query match.

Scoring, or ranking of channels to be returned as a result, is done using a model that computes the similarity between the query and the channel. Some of the parameters involved in computing the results are: Total amounts of terms in channel in the predefined time interval, number of relevant terms in the channel in the predefined time interval, total number of channels searched in the predefined time interval, elapsed time since the last appearance of the relevant term in the channel in the predefined time interval and relevant terms position in the channel. Additional factors for the score: terms in proximity to relevant term, part of speech of relevant terms, relevant term frequency and importance in the language of the channel.

The parameters enable Query and Results Manager 255 to rank the resulting channels, in addition to standard ranking methods by the time parameter as well by giving more weight to phrases than to the collection of single words.

Figure 5:
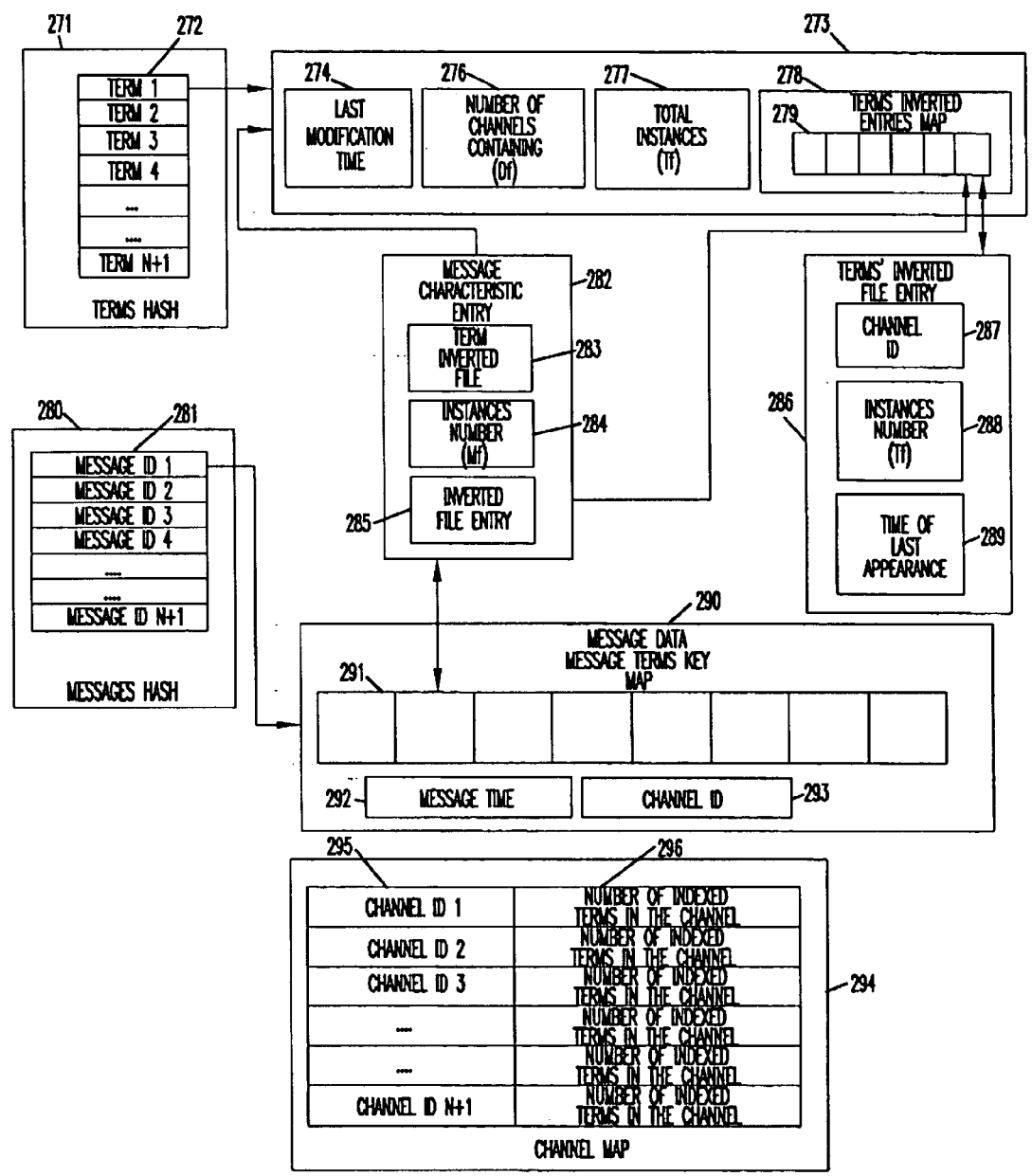
FIG. 5 is a simplified block diagram that illustrates the structure of the terms Index tables, in accordance with a preferred embodiment of the present disclosure.

Referring now to FIG. 5 that illustrates the structure of the Terms Index 256 tables. The Terms Index consists of two main units: The Terms Hash 271 and the Messages Hash 280. Additionally Terms Index contains the Channel Map unit 294.

Terms Hash 271 comprises the Term table 272 and the associated Terms Inverted File 273. The Term Hash 271 comprises of entries whose keys are terms. Therefore, Term Hash 271 provides fast access to the entries by using terms as access keys. The said structure also provides for fast insertion of terms into the table.

The Terms Inverted File 273 comprises of a sorted list of Terms Inverted Entries Map 278 and at least one of the following files: (a) a total number of references (Total Instances) 277 to the term in all the messages currently stored in Messages Buffer 252 of FIG. 2, (b) the modification time of the term (Last Modification Time) 274, or (c) a number of channels that contain the term 276. Each entry, such as entry 786 in Terms Inverted Entries Map 278 is keyed by the channel ID 287 and has the number of references (Instances No) 288 to the term in that channel and the time of the last appearance of the term in the channel (Time of Last Appearance) 289. The number of references that are added to the Total Instances 277 could be used to determine the channel's relevance to a specific query.

Messages Hash 280 indexed by Message ID 281 in order to provide fast deletion of term's references by message. Messages Hash 280 comprises Message ID table 281 and the associated Message Data table 290. Each entry in Message Data table 290 contains information about one message and pointed to by a Message Hash entry 281. Message Data table 290 consists of (a) the channel ID 293 (b) message time 292, and (c) Message Terms Keyed Map 291. The Message Terms Keyed Map 291 is a sorted list of Message Characteristics Entries 282. A pointer 283 keys each entry, which is unique to each term. Therefore, a Message Characteristics Entry 282 can be found easily by a specific term. Message Characteristics Entry 282 contains the following information: (a) the number of times the related term was referred to in the relevant message (Instances No) 284, and (b) a pointer to the related Inverted File Entry 285.

The Channel Map 294 is a list sorted by channel IDs 295. For each channel ID 295, Channel Map 294 holds the total number of currently indexed terms that belong to the channel 296. In the preferred embodiment of the present disclosure, said total number relates to the number of terms after filtering. In a different embodiment of the present disclosure, the total number could relate to the number of terms before filtering or to the average of both values.

The operations supported by the Terms Index 256 of FIG. 4 will be described next. Terms Index 256 of FIG. 2 supports three modes of operation: (1) term insertion, (2) terms deletion by message ID, and (3) term deletion by the garbage collection process.

Term insertion is performed by Term Extractor 248 of FIG. 4 when handling a newly extracted term from an incoming message. The term is indexed in this mode of operation by Term, Message Id, Channel Id and Message Time. When inserting a Term the following sequence of steps is performed:

Twelve) the Term 272 to Terms Inverted File 273 link is accessed or created. A pointer to Terms Inverted File (invertedFilePtr) is saved.

Thirteen) the Total Instances 277 member's value in Terms Inverted File 273 pointed at by invertedFilePtr is increased by one.

Fourteen) the Last Modification Time 274 member in Terms Inverted File 273 pointed at by invertedFilePtr is updated.

Fifteen) the entry for channel Id 287 in Terms Inverted Entries Map 279 is accessed or created. A pointer to the entry is saved as invertedFileEntryPtr.

Sixteen) the value of Instances No 288 member in the entry pointed at by invertedFileEntryPtr is increased by one.

Seventeen) the appropriate Message Data is accessed or created in Message Hash 280. A pointer to the entry is saved as messageData.

Eighteen) the Message Characteristic Entry 282 in Message Data 90/Message Terms Keyed Map 291 is accessed by invertedFilePtr or created. A pointer to the entry is saved as messageCharac.

Nineteen) in the entry pointed at by messagecharac the value of Instances Number 284 member is increased by one.

Twenty) in the entry pointed at by messagecharac, the invertedFileEntry pointer is set to point at invertedFileEntryPtr.

Twenty-one) in the Message Data 290, the Message Time 292 member is updated.

Twenty-two) in the Message Data 290 the channel ID 293 member is updated.

Term deletion by Message Id occurs when a message is deleted. A message can be deleted when the Messages Buffer 252 of FIG. 4 is full or a predetermined time interval indicative of the period a message should be kept in the buffer 252 has been completed. For term deletion by Message Id the following sequence of steps is performed:

Eight) the appropriate Message Terms Keyed Map 291 is obtained from Messages Hash 280.

Nine) for each Message Characteristics Entry 282 that points to Terms Inverted File Ten) the pointed Terms Inverted File 273 is accessed and Total Instances 277 member's value is decreased by the Instances No 284 member's value in Message Characteristic Entry 282.

Eleven) the Term Inverted Entry 286 is accessed and the Instance Number 288 value is decreased by Message Characteristic Entry's local Instances No member 284 value.

Twelve) Message Characteristic Entry 282 is deleted.

Thirteen) steps 'c' through 'e' are repeated until Message Terms Keyed Map 291 is empty.

Fourteen) the Message Id 281/Message Terms Keyed Map 291 link is deleted.

Deleting a term not via Message Id 281 is done periodically by the garbage collecting process. The deletion is performed if the term's last modification time occurred before a specific point in time in the past which implies that there are currently no messages that the specific term refers to or that the term's Total Instances 277 member's value equals zero. When a term is found that satisfies the above conditions a simple deletion of the Term 272 to Terms Inverted File 273 link is performed.

Conveniently, system I can provide real time alert by various manners. According to a first embodiment of the invention, future search module 259 matches a plurality of alert criteria against the content of terms index 256. According to a second embodiment of the invention, terms index 256 has additional field, associated to each term, indicating whether said term is a part of an alert criteria or not. If so—said term is not deleted from terms hash 71 unless a client system requested to delete it. When a real time search is performed, the whole content of the terms hash is checked, while an alert is based upon a check of only the terms identified as a part of the alert criteria.

Figure 9:
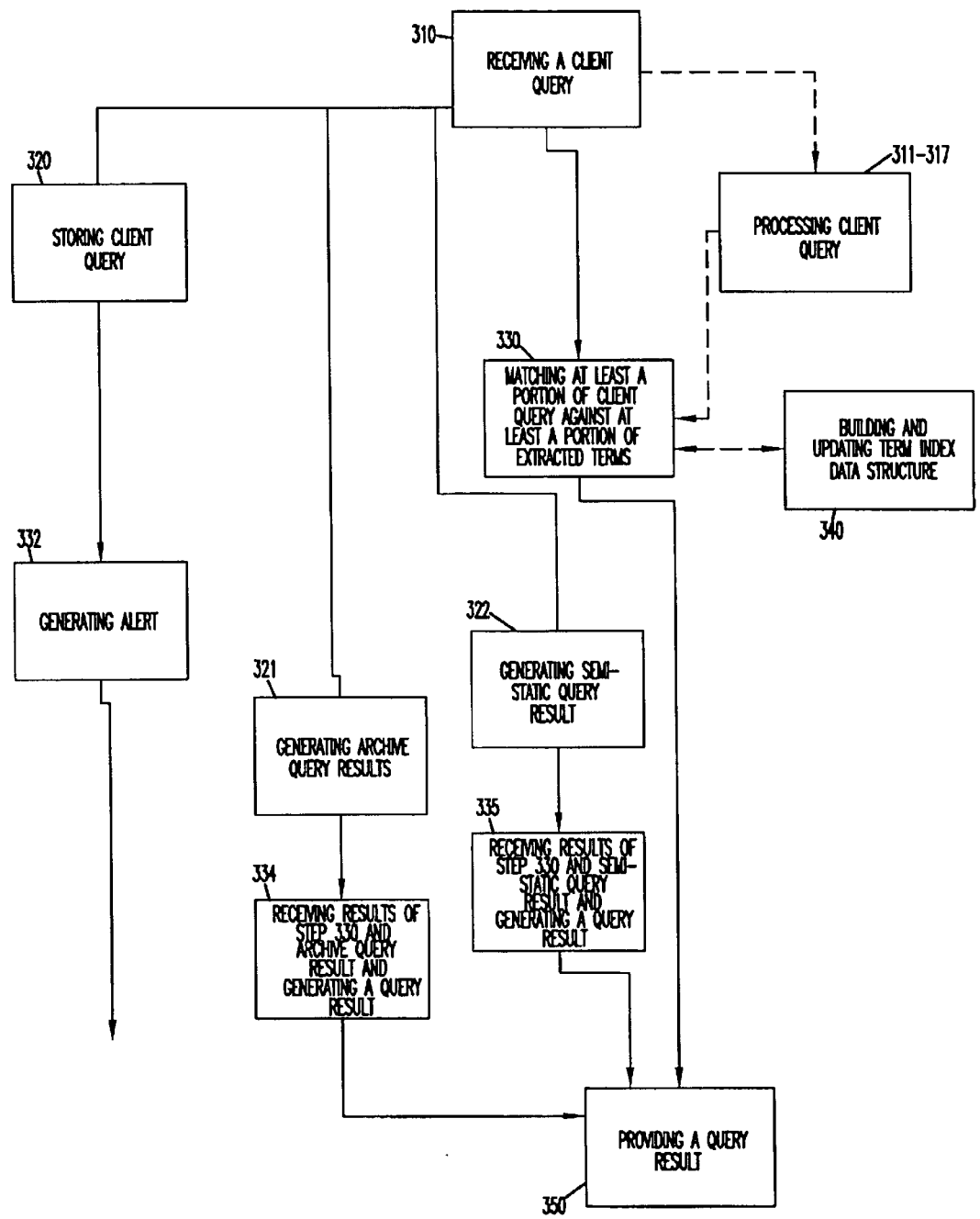
FIG. 9–11 are flow charts illustrating a method for real time search, in accordance with a preferred embodiment of the invention.
Figure 10:
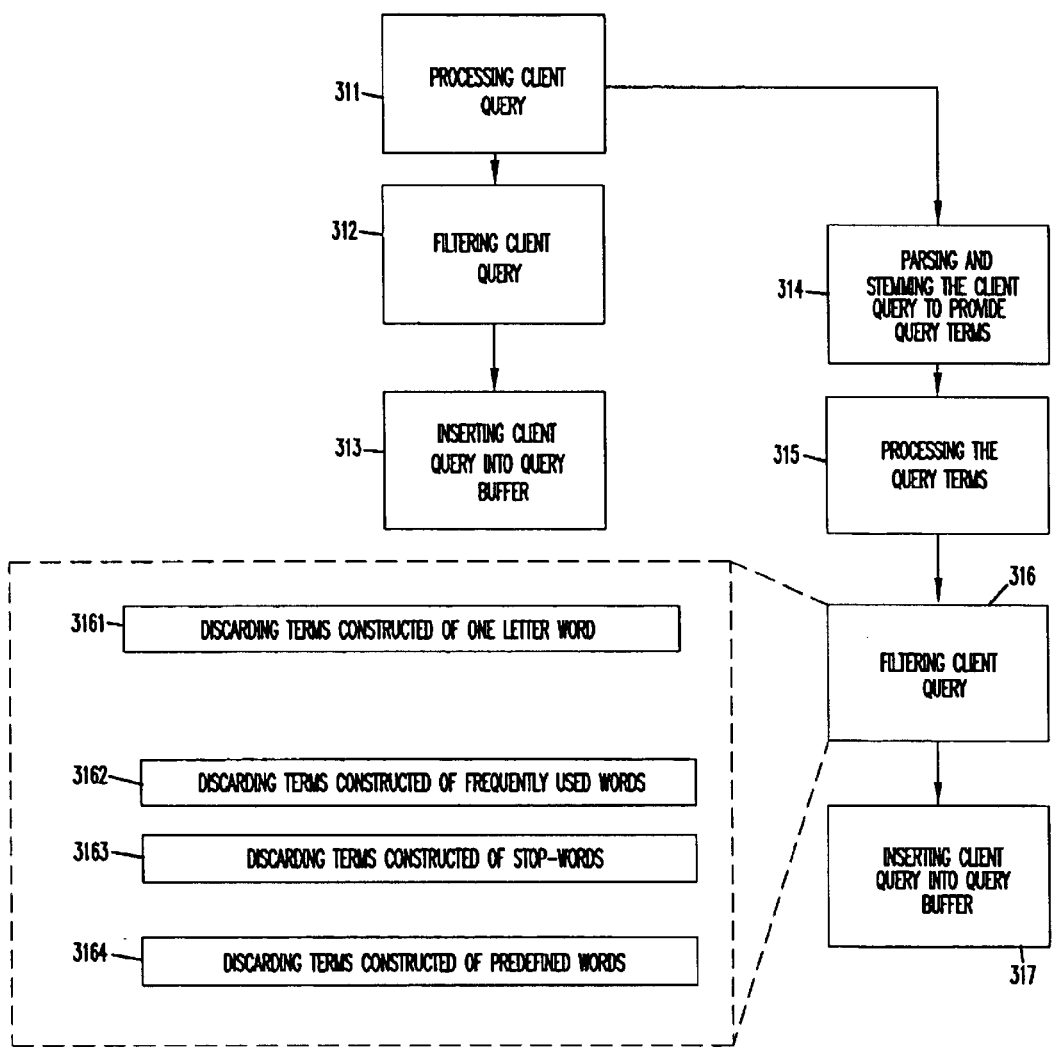
Figure 11:
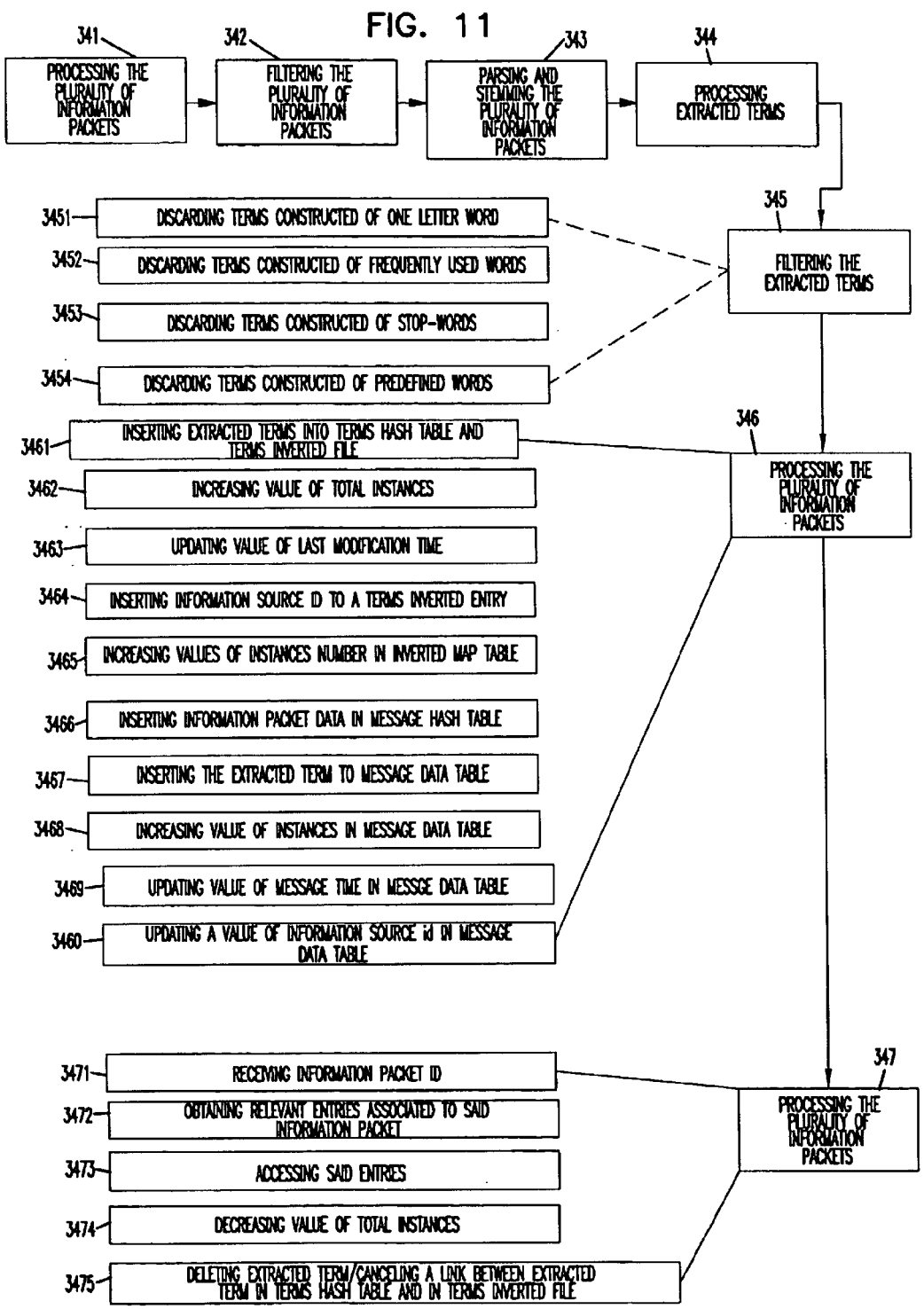

Referring to FIGS. 9–11 illustrating a method 300 for real time search, method 300 comprising steps 310, 330 and 350 and additional optional steps. Method 300 starts at step 310 of receiving a client query, said client query regards a content of at least one information packet. Step 330 is followed by step 330.

Step 330 of matching at least a portion of said client query against at least a portion of a plurality of extracted terms to generate a query result, said extracted terms being extracted out of a plurality of information packets provided from a plurality of information sources, said extracted terms are stored in a storage means for up to a predetermined period of time. Conveniently, the storage means is a term index data structure.

Conveniently, step 330 is preceded by step 340 of building and updating the term index data structure. Step 340 comprising of at least one of the following steps: Step 341 of processing the plurality of information packets by adding control data to said information packets. The control data comprising of information packet identification, information source identification and time of arrival. Step 342 of filtering the plurality of information packets. Step 343 of parsing and stemming the plurality of information packets. Step 344 of processing said extracted terms by adding control information to said extracted terms. Step 345 of filtering the extracted terms to generate filtered extracted terms. Preferably, step 345 further comprising at least one of the following steps: step 3451 of discarding said terms constructed of one-letter words; step 3452 of discarding said terms constructed of frequently used words; step 3453 of discarding said terms constructed of stop-words and step 3454 of discarding said terms constructed of predefined words.

Step 346 of storing an extracted term in a term index data structure. Step 346 is preferably comprising following steps step 3461 of inserting the extracted term into a terms hash table and into a terms inverted file; step 3462 of increasing a value of total instances in said terms inverted file; step 3463 of updating a value of last modification time in said terms inverted file; step 3464 of inserting an information source identification, said information source provided the extracted term, to a terms inverted entry map table in said terms inverted file; step 3465 of increasing a value of instances number in said inverted entry map table associated with said information source identification in said terms inverted file; step 3466 of inserting information packet data in a messages hash table; step 3467 of inserting the extracted term from said information packet to a messages data table; step 3468 of increasing a value of instances in said messages data table by one; step 3469 of updating a value of message time in said messages data table; and step 3460 of updating a value of information source identification in said message data table.

Step 346 is followed by step 347 of deleting the extracted term from the terms index data structure. Said deletion occurs either after a message from which said term was expired is stored in the message buffer for a predetermined period of time. Said term can also be deleted as a result of a garbage collection process, said process is based upon a deletion of terms that are not mentioned during a certain period.

Preferably, step 347 comprising the steps of: step 3471 of receiving an information packet identification, whereas the terms extracted from the information packets are to be deleted; step 3472 of reading the information packet identification from the messages hash table in said terms index data structure; step 3472 of obtaining relevant entries of said extracted terms belonging to said information packet in said messages data; step 3473 of accessing said terms inverted file for each said terms entry pointed to said terms inverted file; and step 3474 of decreasing a value of said total instances by a value of said instances number for each said terms entry pointed to said terms inverted file. Step 347 further comprises of step 3475 of deleting an extracted term by a garbage collection process and canceling a link between said term in said terms hash table and said terms inverted file is canceled.

Conveniently, step 310 is followed by step 311 of processing the client query by adding control data to said client query. Step 310 is followed by step 312 of filtering the client query. Said filtering involves excluding said information packets generated from predefined client systems. Step 310 is also followed by step 314 of parsing and stemming the client query to generate query terms. Step 314 is followed by step 315 of processing the query terms by adding relevant control information to the query-terms. Step 315 is followed by step 316 of filtering said query terms. Step 316 further comprising of at least one of the following steps: step 3161 of discarding said terms constructed of one-letter words; step 3162 of discarding said terms constructed of frequently used words; step 3163 of discarding said terms constructed of stop-words; and step 3164 of discarding said terms constructed of predefined words. Step 316 is followed by step 317 of storing said query terms in a term index data structure for a period that is shorter than a predefined period of time or until a query removal request is received from a user.

Conveniently, method 300 allows to perform more than a single search Mode In addition to a first mode in which an incoming client query is matched against a content of the storage means, method 300 comprises of steps 320, 321 and 322 for allowing additional search modes. When more than a single search mode is selected, results of some search modes are unified to provide a single search result.

A path comprising of steps 320 and 332 allows to provide alerts. Said path starts by step 320 of storing client queries follows step 310. Conveniently, step 320 comprising of s a step of updating query index 58. Step 320 is followed by steps 332 of matching client queries/alert criteria received and processed in the past against newly received terms to generate an alert.

Step 321 of matching the client query against historical archives of informational content to generate an archive query result is followed by step 334 of processing the archive query result and a result of the step 330 to generate the query result.

Step 322 of matching the client query against a semi-static database of said informational content and having a low incidence of changing to generate a semi static query result, is followed by step 335 of matching the client query against the semi-static database is followed by a step of processing the semi static query result and a result of the step of matching at least a portion of said client query against at least a portion of a plurality of extracted terms to generate the query result.

Conveniently, a query result comprises of at least one information source, said at least information source provided a matching information packet. Step 330 further comprises a step 336 of ranking information sources according to a similarity between at least a portion of information packets provided by said information sources and between the client query. Preferably, said ranking process is based upon at least one of the following parameters: (a) a total amount of extracted terms provided by an information source in a predefined time interval; (b) an elapsed time since the extracted term was provided by the information source in said predefined time interval; and (c) an extracted term position in the information source.

Figure 12:
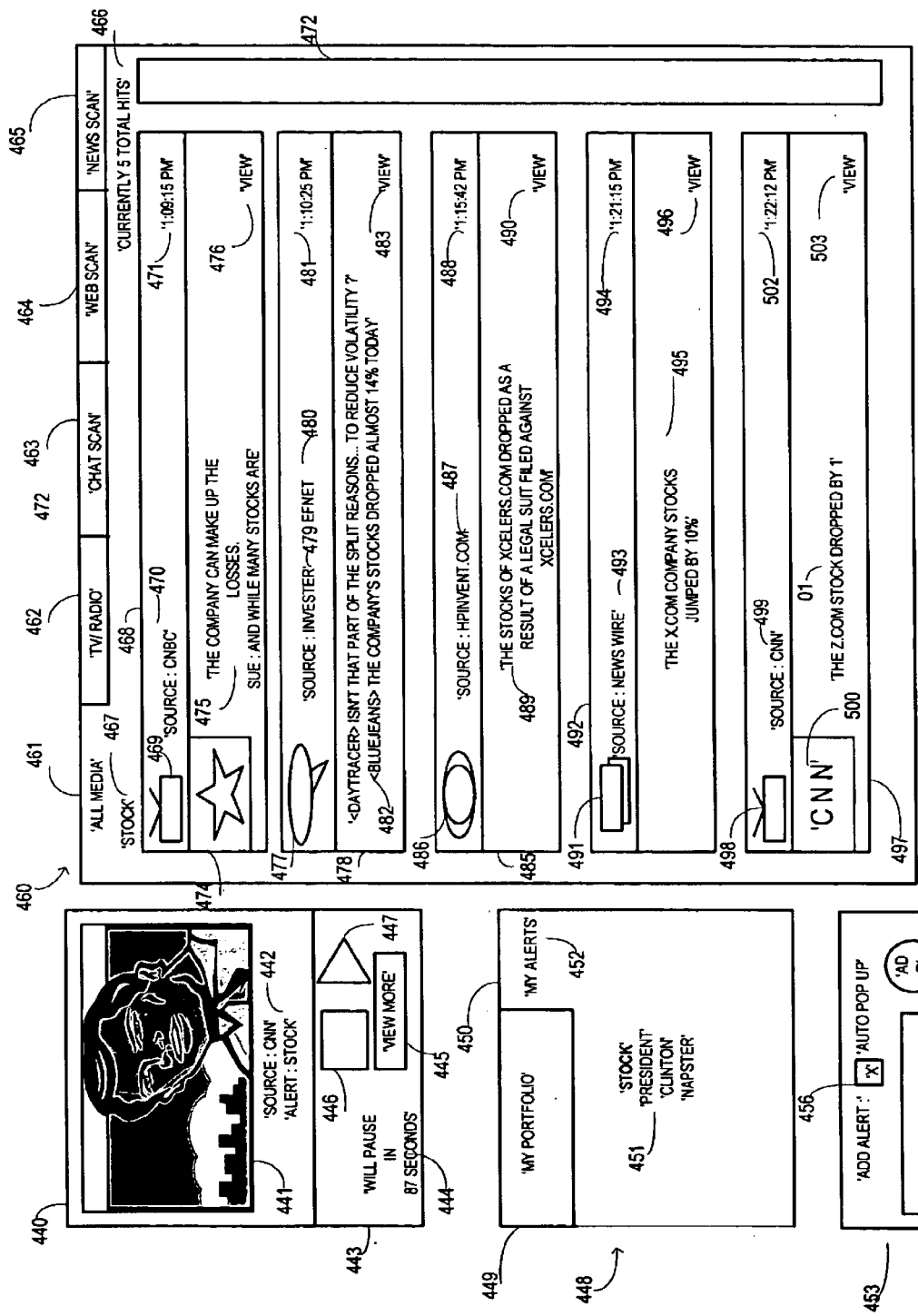
FIGS. 12–14 are schematic description of various media monitor pages according to preferred embodiments of the invention.

Referring to FIG. 12 Illustrating a media monitor page 400 for presenting real time alerts, such as real time alerts displayed in alert windows 468, 478, 485, 492 and 497. The alert displayed in alert window 468 reflects a reception of at least one significant real time information packet generated by a television broadcaster. The alert displayed in alert window 478 reflects a reception of at least one significant real time information packet generated by a chat channel. The alert displayed in alert window 485 reflects a reception of at least one significant real time information packet from a matching web page or message board. The alert displayed in alert window 492 reflects a reception of at least one significant real time information packet generated by a news wire. The alert displayed in alert window 497 reflects a reception of at least one significant real time information packet generated by a television broadcaster. Monitor page 400 comprising of page 401, alert display area 460 for displaying said real time alerts 468, 478, 485, 492 and 497, alert criteria display area 448 for viewing alert criteria, such as alert criteria 'STOCK ', 'PRESIDENT ', 'CLINTON' and 'NEPSTER'.

Alert windows 468, 478, 485, 492 and 497 further display information source visual identifiers such as 'SOURCE: CNBC' 470 and a figure of a star 474; 'SOURCE: INVESTER' 479; 'SOURCE: HPINVENT.COM' 487, 'SOURCE: NEWS WIRE' 493 and 'SOURCE: CNN' 499 and a logo of CNN 500. An information source visual identifier identifying information sources that either provided significant information packets that match alert criteria 'STOCK' or that the alert criteria 'STOCK' appeared in an information packet representative of a content of broadcast signal broadcasted from said information source.

Alert windows 468, 478, 485, 492 and 497 further display a portion of an information stream such as 'THE COMPANY CAN MAKE UP THE LOSSES, SUE: AND WHILE MANY STOCKS ARE' 475; '<DAYTRACER>INS'T THAT PART OF THE SPLIT REASONS. TO REDUCE VOLATILITY ?, <BLUE GEANS>THE COMPANY'S STOCKS DROPPED ALMOST 14% TODAY' 482; 'THE STOCKS OF XCELERS.COM DROPPED AS A RESULT OF A LEGAL SUIT FILED AGAINST XCELERS.COM' 489; 'THE X.COM COMPANY STOCKS JUMPED BY 10%' 495; and 'THE Z.COM STOCK DROPPED BY 1' 501.

Page 400 further comprising multimedia display area 440 for displaying video streams, audio streams and multimedia streams associated to a real time alert, wherein said multimedia stream is displayed in response to a selection said real time alert. Multimedia stream 441 is associated to alert 497. Multimedia display area 440 further displaying information 442 for describing the information source of the multimedia stream 'SOURCE: CNN' and for describing the associated alert criteria 'ALERT: STOCK'. Multimedia display portion 440 further comprising of multimedia control window 443, for allowing to control the display of said multimedia stream. Control window 443 comprising of stop button 446, play button 447, button 445 for requesting to view consecutive multimedia stream portion. Control window further displays a remaining length of a displayed multimedia stream: 'WILL PAUSE IN 87 SECONDS' 444 indicated that the display of multimedia stream 441 will end in 87 seconds.

Alert criteria display area 460 comprising of a plurality of alert display subsections, such as subsections 461, 462, 472, 464 and 465. All media subsection 461, denoted 'ALL MEDIA' for displaying alerts generated as a result of a reception of significant information packet associated to information sources of various categories. Television radio alert subsection 462, denoted 'TV/RADIO' is adapted to display at least one real time alert, each real time alert generated as a result of a reception of a significant information packet selected from a group consisting of: a significant information packet provided by a radio broadcaster; a significant information packet provided by a television broadcaster; a significant information packet representative of a content of a broadcast signal generated by a television broadcaster; and a significant information packet representative of a content of a broadcast signal generated by a radio broadcaster. Chat scan alert subsection 472 denoted 'CHAT SCAN' is adapted to display at least one real time alert, each real time alert generated as a result of a reception of a significant information packet selected from a chat channel.

Figure 13:
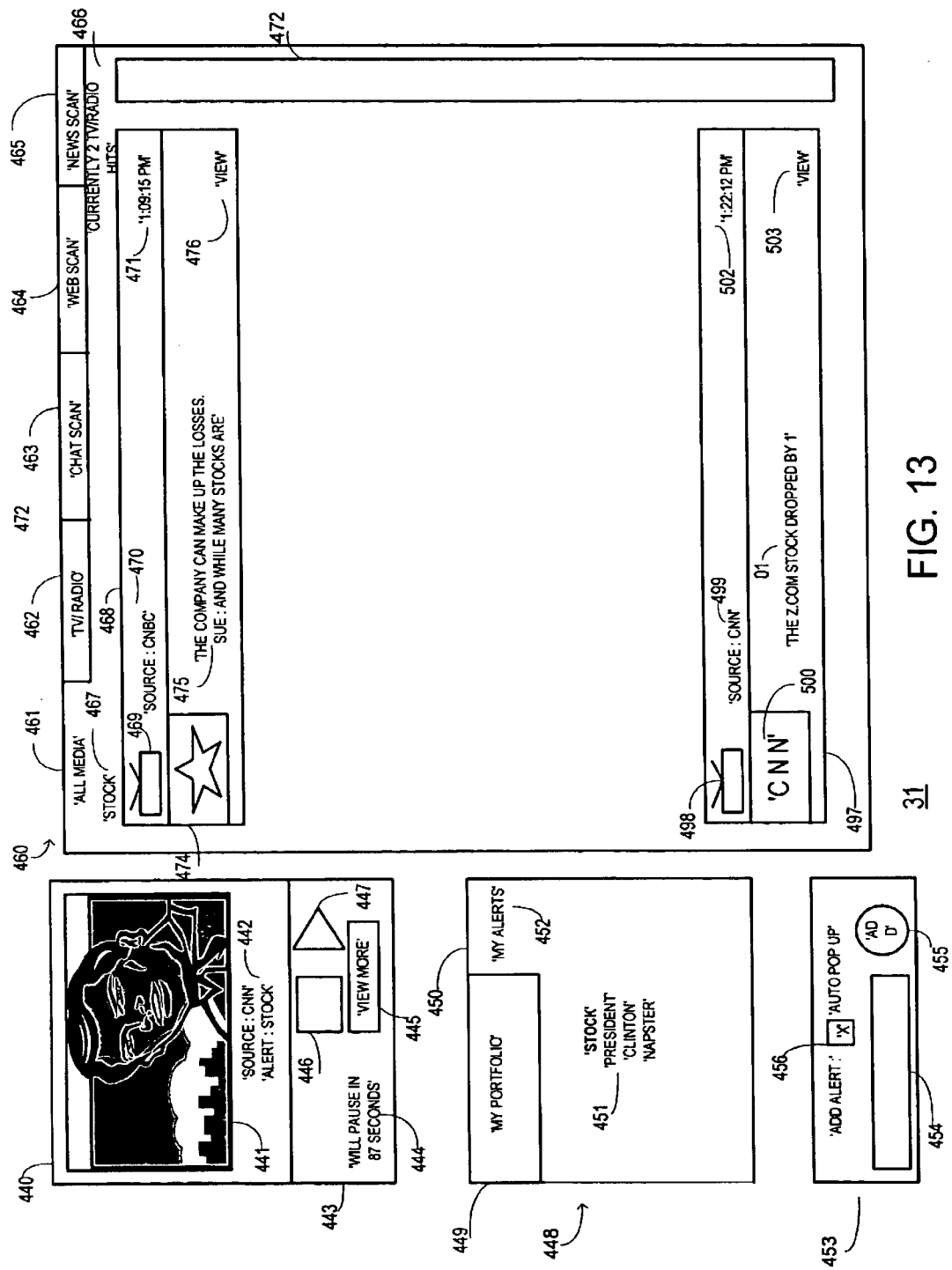
Figure 14:
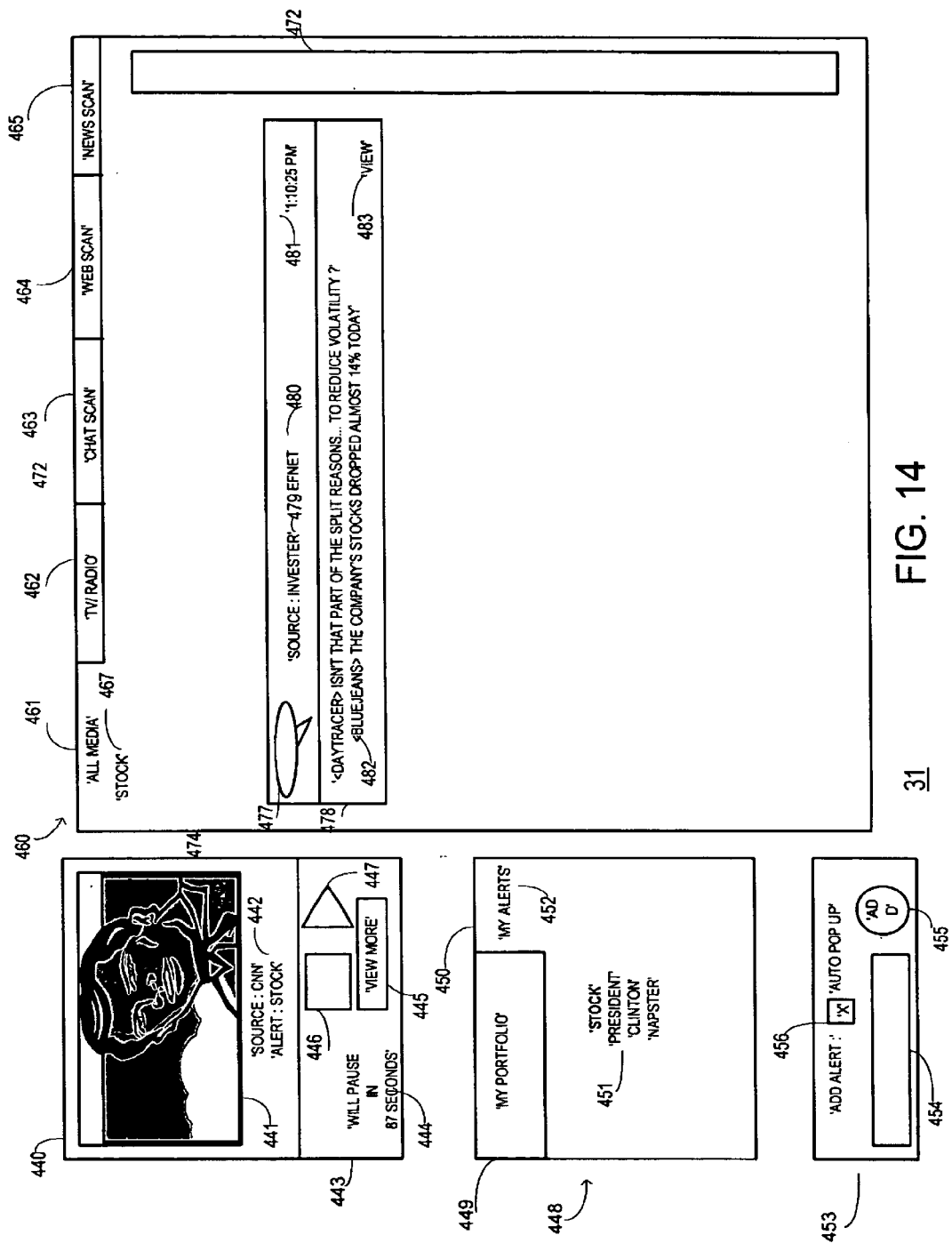

Web scan alert subsection 464 denoted 'WEB SCAN' is adapted to display at least one real time alert, each real time alert generated as a result of a reception of a significant information packet from a web site or a message board. News scan alert subsection 456, denoted 'NEWS SCAN' is adapted to display at least one real time alert, each real time alert generated as a result of a reception of a significant information packet selected from a news wire or from an article archive. FIG. 12 illustrates page 400 wherein 'ALL MEDIA' subsection 461 is selected, while FIG. 13 illustrates media monitor page 400 wherein 'TV/RADIO' subsection 462 is selected and FIG. 14 illustrates media monitor page 400 wherein 'CHAT SCAN' subsection 472 is selected.

Each alert window further displays a time of generation of said matching information source. For example, '1:09:15 PM' 471 in alert window 474, '1:10:25 PM' 481 in alert window 478, '1:15:42 PM' 488 in alert window 485, '1:21:15 PM' 494 in alert window 492, '1:22:12 PM' 502 in alert window 497.

Alert windows have 'VIEW' buttons 476, 483, 490, 496, 503, whereas a selection of a 'VIEW' button causes a display of additional information associated to alerts displayed is said alert windows. For example, a selection of 'VIEW' button 503 caused a display of multimedia stream 441. Alert 497 was displayed as a result of a reception of a significant information packet at time 1:22:12, as indicated by indication 502. Said significant information packet can be a part of multimedia stream 441 or can represent a content of said multimedia stream 441. Accordingly, at least a portion of multimedia stream 441 was broadcast or received at 1:22:12 or can. Multimedia stream 441 can also be provided from the television station or retrieved from a storage means, such as data manager 420. According to another aspect of the invention multimedia stream can be associated to the television broadcast and not to the significant information packet that caused alert 497 to be displayed.

A selection of 'VIEW' button 483 can initiate an application for linking the user to chat channel 'INVESTER'. A selection of 'VIEW' button 90 can cause to display additional portions out of the 'HPINVENT.COM' internet site. A selection of 'VIEW' button 496 can cause a display of an article from news wire 93.

Monitor page 400 further comprising alert criteria display area 448 having two alert display subsections 449 and 450. Alert display subsection 449 labeled 'MY ALERTS' while subsection 449 labeled 'MY PORTFOLIO'. Each alert display subsection displays a group of associated alert criteria. For example, subsection 449 displays the following alert criteria 'STOCK', 'PRESIDENT', 'CLINTON' and 'NEPSTER'. Media monitor 400 further comprising of a alert criteria add section 453, for adding an alert criteria. A selection of an alert criteria displayed in alert criteria section 448 causes a display of an alert configuration window 540 (shown in FIG. 15) for configuring an alert message format. Alert criteria add section 453 comprising a window 54 for inserting an new alert criteria, an ADD button 455 for confirming an addition of a new alert criteria, a 'AUTO POP UP' button for determining whether to display an alert configuration window 540 in response to a selection of 'ADD' button 455.

Figure 15:
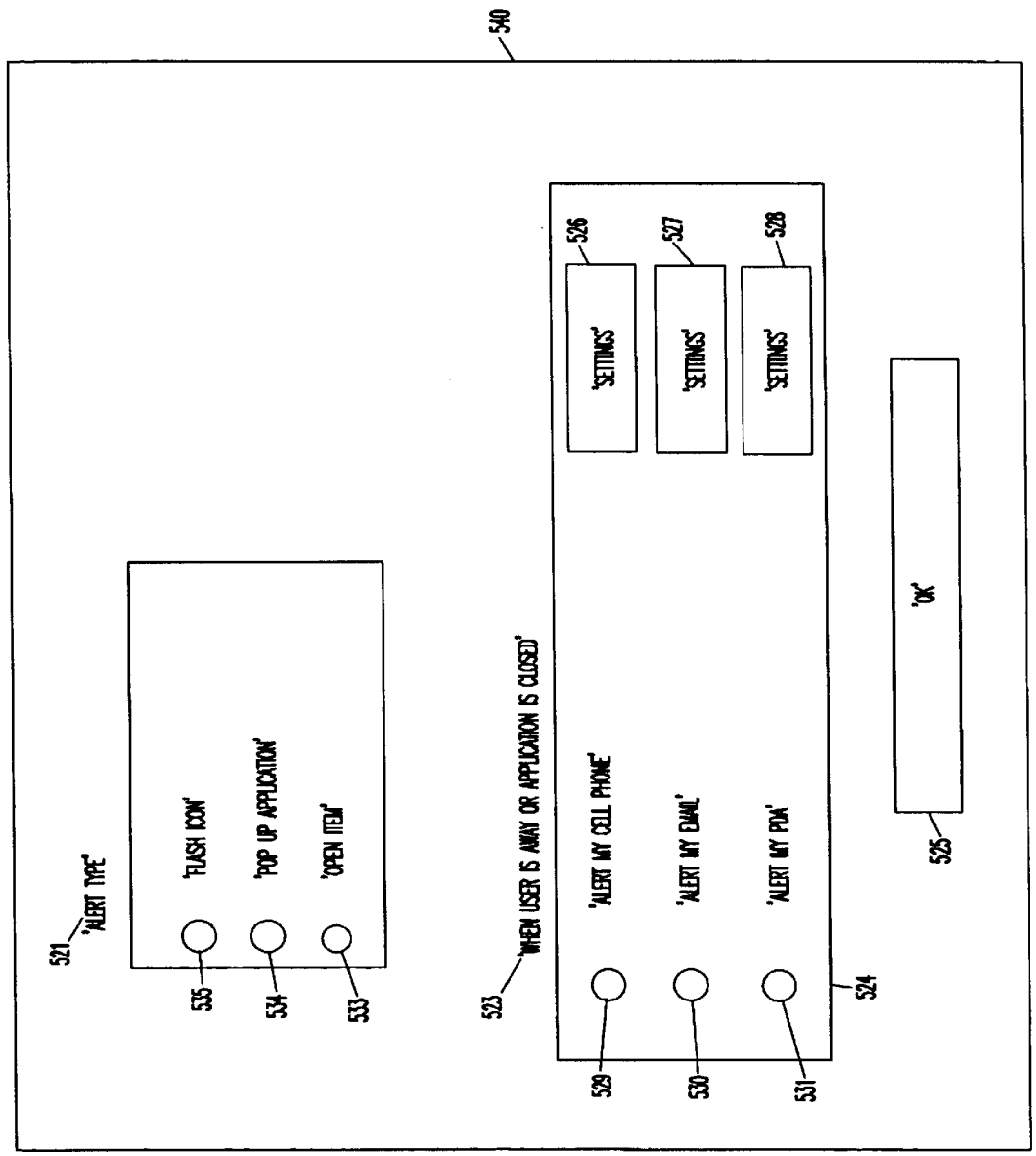
FIG. 15 is a schematic description an alert configuration window, according to preferred embodiments of the invention.
Figure 16:
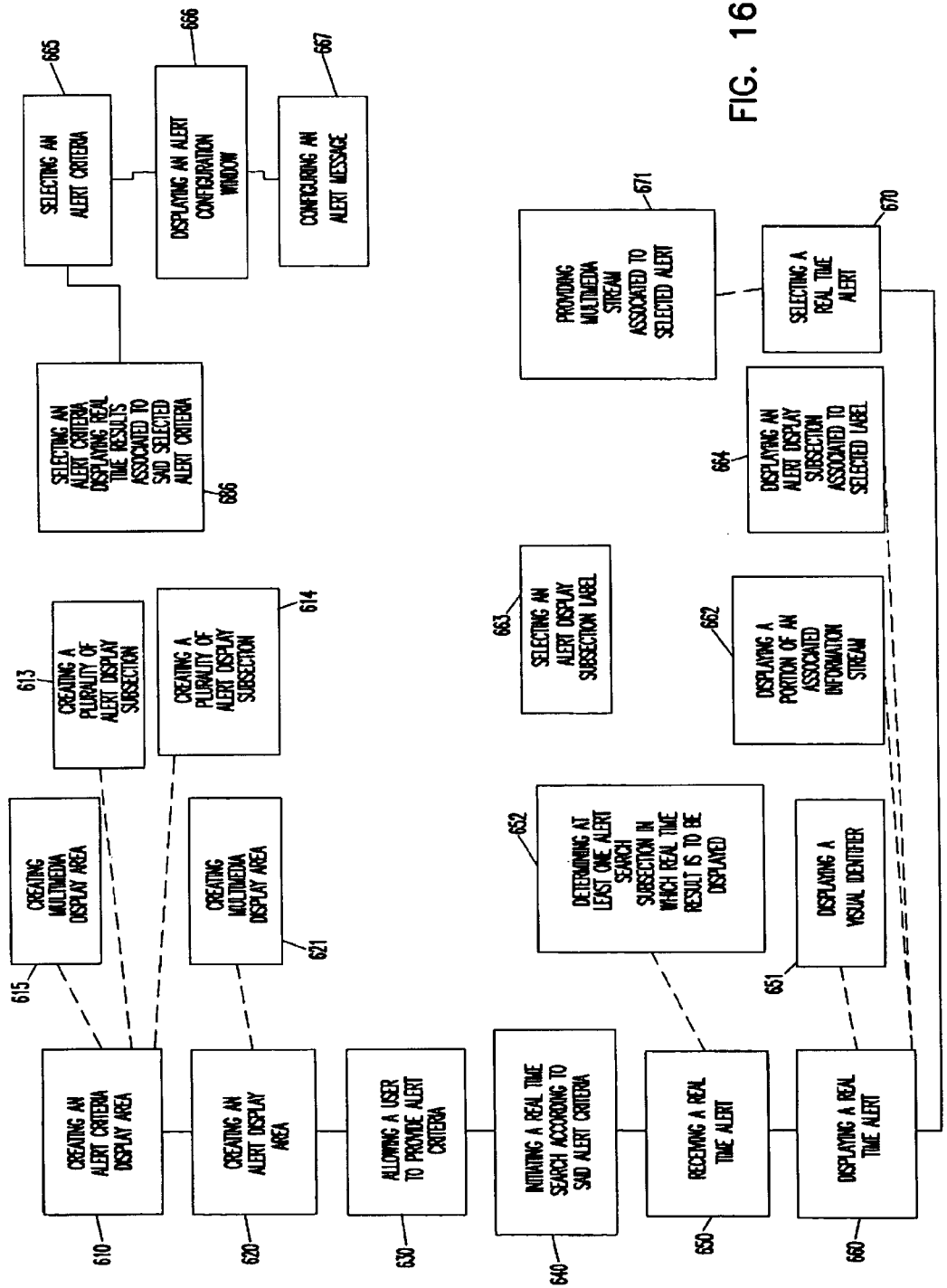
FIGS. 16–17 are flow chart diagrams illustrating a method for generating and updating a monitor media page, according to preferred embodiments of the invention.
Figure 17:
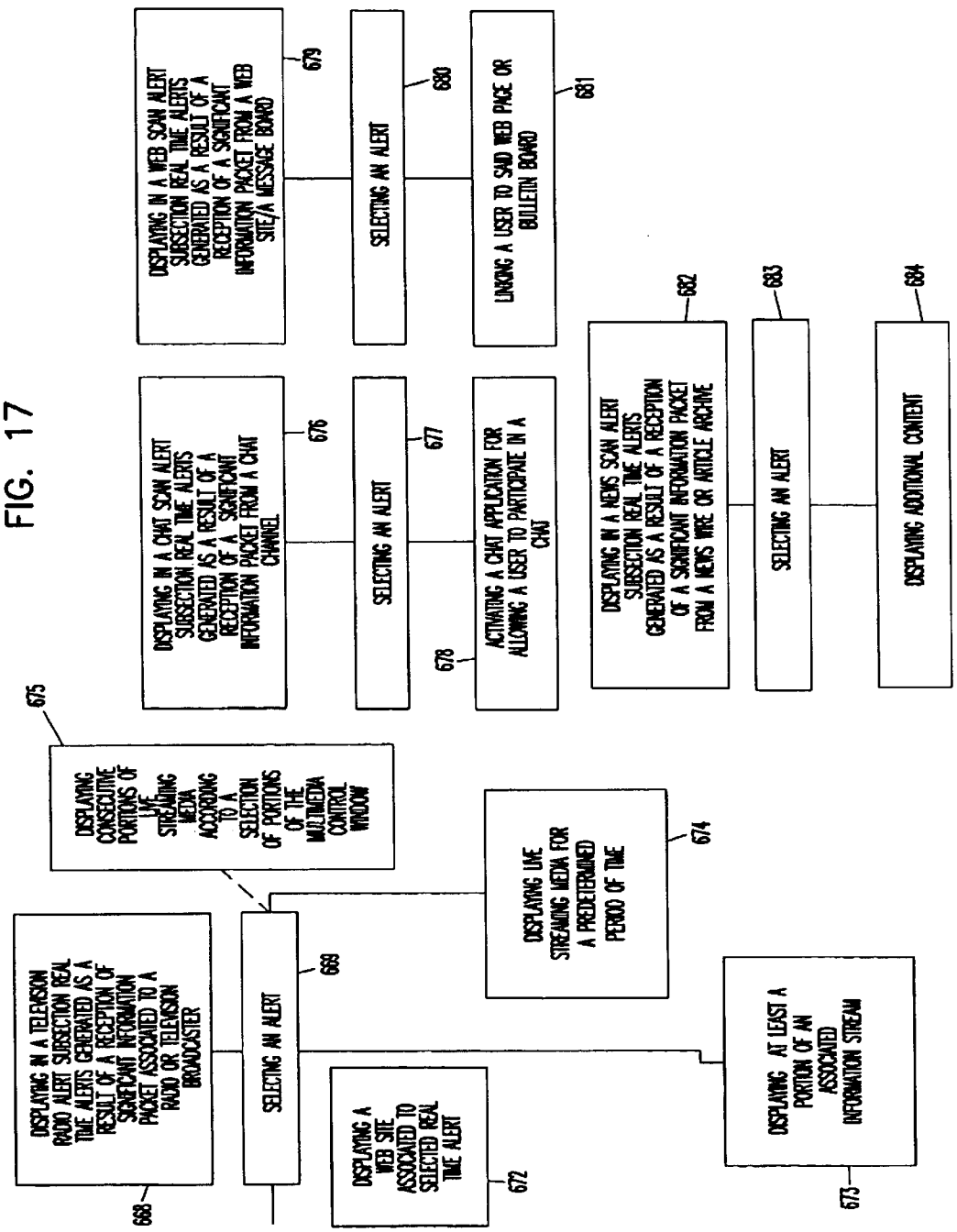

FIG. 15 illustrates alert configuration window 540 for controlling a display of an alert. Window 540 comprising first window 522 labeled 'ALERT TYPE' 121 having 'FLASH ICON' button 135, 'POP UP APPLICATION' button 134 and 'OPEN ITEM' button 133 for allowing to display an alert accordingly, and has a default window 124 labeled 'WHEN A USER IS AWAY OR APPLICATION IS CLOSED' 123 for allowing a client to receive an alert in default manner, said window 124 comprising of 'ALERT MY CELL PHONE' button 126, 'ALERT MT EMAIL' button 130 and 'ALERT MY PDA' 131, and additional 'SETTING' buttons 126–128 for configuring said alert accordingly.

FIGS. 16–19 illustrate method 600 for creating and updating a media monitor page, according to preferred embodiments of the invention. Method 600 comprising the steps of: creating (step 610) an alert criteria display area on the page for displaying alert criteria; creating (step 620) an alert display area on the page for displaying real time alerts; allowing (step 630) a user to provide alert criteria, to be displayed in the alert criteria display area; initiating (step 640) a real time search according to said alert criteria; receiving (step 650) a real time alert, reflecting a reception of at least one significant real time information packet that match at least a portion of an alert criteria displayed in said alert criteria display area; and displaying (step 660) the real time alert in an alert window on the alert display area.

Conveniently, step 660 of displaying the real time alert further comprising step 661 of displaying at least one visual identifier selected from a group consisting of: an information source visual identifier, said information source visual identifier identifying a matching information source; said matching information source provided said significant information packet; and a category visual identifier, said category visual identifier identifying a category of the matching information source. Step 660 further comprising step 662 of displaying a portion of an information stream, said information stream comprising of said significant real time information packet.

Conveniently, method 600 further comprising step 621 of creating a multimedia display area on the page, for displaying multimedia streams; step 670 of selecting a real time alert; and step 671 of providing a multimedia stream associated to said real time alert.

Conveniently, step 610 of creating the alert criteria display area further comprising step 613 creating a plurality of alert display subsections; each alert display subsection for displaying a group of associated alert criteria; step 663 of selecting an alert display subsection label; and step 664 of displaying an alert display subsection associated to said label.

Conveniently, the alert criteria display area further comprising of a alert criteria add section, for adding an alert criteria. Method 600 further comprising step 665 of selecting an alert criteria displayed in the alert criteria section, step 666 of displaying an alert configuration window and step 667 of configuring an alert message format.

Conveniently, step 610 further comprising of step 614 of creating a plurality of alert display subsection areas, each alert search subsection for displaying at least a portion of a plurality of real time alerts. Accordingly step 650 is followed by step 652 of determining at least one alert search subsection in which the real time result is to be displayed during step 660 of displaying the real time alert. Conveniently, said determination is based upon a category of an information source, said information either provided said significant information packet or said significant information packet is representative of a content of a broadcast signal generated by said information source.

Conveniently, step 660 comprising of step 668 of displaying in a television radio alert result subsection a real time alert being generated in response to a reception of a significant information packet selected from a group consisting of: a significant information packet provided by a radio broadcaster; a significant information packet provided by a television broadcaster; a significant information packet representative of a content of a broadcast signal generated by a television broadcaster; and a significant information packet representative of a content of a broadcast signal generated by a radio broadcaster. Step 668 can is followed by step 669 of selecting a real time alert displayed on the television radio alert subsection. Step 669 is followed by one of the following steps: step 672 of displaying a web site associated to the real time alert, step 673 of displaying at least a portion of an stream associated to the real time alert, said stream selected from a group consisting of: audio stream; video stream; multimedia stream, or step 674 of displaying live streaming media for a predetermined period of time in a multimedia display portion on the page, said live streaming media associated to the real time alert.

Conveniently, method 600 further comprising step 615 of creating a multimedia control window, for allowing to display consecutive portions of said live streaming media; and of step 675 of displaying consecutive portion of said live streaming media in response to a selection of various portions of the multimedia control window.

Conveniently, method 600 further comprising step 676 of displaying in a chat scan alert subsection a real time alert being generated in response to a reception of a significant information packet from a chat channel. Step 676 is followed by step 677 of selecting a real time alert displayed within the chat scan alert subsection, and step 678 of activating a chat application for allowing a user to participate in a chat channel that provided the significant information packet.

Conveniently, method 600 further comprising step 679 of displaying in a web scan alert subsection a real time alert being generated in response to a reception of a significant information packet from a web site or a message board. Step 679 is followed by step 680 of selecting a real time alert displayed on the web scan alert subsection; and step 681 of linking a user to said web page or said message board.

Conveniently, method 600 further comprising step 682 of displaying in a news scan alert subsection a real time alert being generated in response to a reception of a significant information packet provided by a news wire or by an article archive. Step 682 is followed by step 683 of selecting a real time alert displayed in the news scan alert subsection; and step 684 of displaying additional content from said news wire or said article archive.

Conveniently step 665 of selecting an alert criteria is followed by step 686 of displaying real time alerts indicating a reception of at least one significant information packet that match said selected alert criteria.

Conveniently method 600 further comprising step 687 of displaying a time of reception or a time of generation of a significant information packet associated to the real time alert.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A media monitor system for monitoring content of a plurality of information streams provided by a plurality of information sources coupled to said media monitor system, said media monitor system adapted to be coupled to a plurality of client systems, said media monitor comprising:

retrieval means, adapted to be coupled to the plurality of information sources, for receiving information streams from the information sources, and providing information signals comprising information packets representative of at least a portion of the information streams;

distribution means, adapted to be coupled to a plurality of client systems, for receiving client queries and client requests to update or create alert criteria, and for providing client systems real time alerts and query results; and analysis means, coupled to the distribution means and to the retrieval means for storing said information signals provided by the retrieval means, for real time matching of information signals against alert criteria to generate a real time alert and for real time matching of client queries against the information signals to generate query results, wherein the analysis means comprises:

a real time alert logic, for real time matching of information signals against alert criteria to generate a real time alert; and a real time search engine, for real time matching of client queries against the information signals to generate query results, wherein the real time search engine comprises:

an information packet processor, for receiving an information packet and for processing the information packet to generate at least one processed portion of the information packet;

storage means coupled to the information packet processor, for temporarily storing information representative of a reception of the at least one processed portion of the information packet, wherein the storage means are configured to allow fast insertion and fast deletion of content, and wherein the storage means is a term index data structure adapted to hold indexed extracted terms and information packet identifiers, wherein the term index data structure comprises:

a terms hash table to hold extracted, filtered and processed terms;

a terms inverted file pointed to by said term hash table holding a terms inverted entry map;

a message hash table to hold information packets identification;

a messages data table to hold information packets data;

a channel map to hold a list of information sources and the related number of index terms of said information source; and a query and result manager, coupled to the storage means for matching a received client query against at least a portion of content of the storage means to generate a query result.

2. The system of claim 1 wherein the information signals are computer readable signals.

3. The system of claim 1 wherein the information signals are information packets.

4. The system of claim 1 wherein the distribution means comprises:

a plurality of interfaces, each interface for receiving, from at least one client system, client requests and client queries in a client system format, wherein said client system format differs from a media monitor system compatible format, and formatting the client requests and the client queries in a monitor media system compatible format, for receiving alerts and query results in a media monitor system format, converting said received alerts and query results to the client system compatible format, and for dispatching said converted alerts and said converted query results to at least one designated client system;

a client manager, coupled to said plurality of interfaces, for storing and updating client system profiles, for processing said client profiles to determine at least one parameter selected from the group consisting of: the designated client systems, a format of an alert, a format of a query result, relevant information to add to the alert, relevant information to add to the query result;

a dispatcher, coupled to the client manager and to the plurality of interfaces, for receiving said at least one parameter from the client manager, to fetch relevant information from the analysis means and for providing alerts and query results client systems for said plurality of interfaces.

5. The media monitor system of claim 4 wherein the distribution means further comprises:

a query and alert manager, for receiving client requests and client queries from the dispatcher and providing them to the analysis means;

a data builder, coupled to the dispatcher and to the analysis means, for receiving requests from the dispatcher to fetch relevant information from the analysis means, accessing the analysis means, fetching said relevant information and for providing the relevant information to the dispatcher;

a history manager for storing client queries and client requests to update to create alert criteria and for client system retrieval.

6. The media monitor system of claim 1, wherein the retrieval means comprises a plurality of agents selected from the group of agents consisting of:

an agent having an audio recognition means, adapted to receive information streams comprising of audio information and to generate a stream of information packets representative of the content of the audio information;

an agent having an encoder, adapted to receive information streams comprising audio information and to generate a stream of information packets containing said audio information;

an agent having visual recognition means, adapted to receive information streams comprising visual information and to generate a stream of information packets representative of the content of the visual information;

an agent having a encoder, adapted to receive information streams comprising visual information and to generate a stream of information packets containing said visual information;

an agent having a parsing means, adapted to receive a stream of computer readable signals and to parse said stream to provide a plurality of information packets.

7. The monitor media page system of claim 1 further comprising a data manager for storing said information signals, and for allowing the distribution means to fetch relevant information associated to an information signal that caused said alert module to issue an alert.

8. The system of claim 1 further comprising at least one module selected from the group of modules consisting of:

a message coordinator module adapted to coordinate handling of a plurality of information packets;

a message buffer adapted to hold temporarily the plurality of information packets;

a message filter module for filtering the plurality of information packets according to predefined rules;

a term extractor module for performing parsing and stemming on said plurality of information packets;

a terms filter for excluding extracted terms according to predefined rules;

a queries coordinator module to coordinate the processing of client queries;

a query-term extractor to parse and stem incoming queries in order to extract and process operative query-terms;

a query-terms filter for excluding specific query-terms in a predefined manner;

an archive search module for indexing data on archive files containing historical informational content and for returning results according to said indexed data;

a semi-static database search module to act on a semi-static database holding semi-static information source control data;

a future search module for matching extracted terms from the plurality of information packets against static queries; and a queries index for holding queries for a predefined time frame to provide means of future search.

9. The system of claim 1 wherein the terms inverted file further comprises:

a terms inverted entries map table;

a total instances of said term;

a number of information sources containing said term; and a last modification time of said term.

10. The system of claim 9 further comprising:

a message terms keyed map;

an information source identification; and an information packet time of arrival.

11. The system of claim 10, wherein the message terms keyed map further comprises:

a pointer to said terms inverted file;

an instances number of said term in said information packet; and a pointer to said inverted file entry related to said term.

12. The system of claim 11, wherein the terms inverted entries map further comprises:

an information source identification;

an instances number of said term in said information source informational content; and a time of last appearance of said term in said information source informational content.

13. The system of claim 1 wherein said high update storage means allows fast insertion and deletion of content.

14. The system of claim 1 wherein the fast update storage means further allows timely deletions of irrelevant or time-decayed terms and query-terms.

15. The system of claim 1 further comprising at least one of the following:

adding means for adding control data to said information packets;

filtering means for the plurality of information packets;

processing means for said extracted terms by adding control information to said extracted terms; and term filtering means for the extracted terms to generate filtered extracted terms.

16. The system of claim 1, wherein the extracted terms are extracted out of the plurality of information packets by parsing and stemming the plurality of information packets; and wherein the term filtering means are adapted to (a) discard said terms constructed of one-letter words; (b) discard said terms constructed of frequently used words; (c) discard said terms constructed of stop-words; and (d) discard said terms constructed of predefined words.

17. The system of claim 16 wherein the control data comprises information packet identification, information source identification and time of arrival.

18. The system of claim 1 further adapted to receive an information packet, to storing the information packet with an associated packet identifier in an information packet storage means, store extracted term information representative of a reception of at least one extracted term, said at least one extracted terms extracted from the information packet; and to link between the stored information packet and the extracted term information.

19. The system of claim 18 further adapted to delete an information packet and delete the linked extracted term information.

20. The system of claim 18 wherein information packets are stored in a messages hash, and wherein the linked extracted term information is stored in a terms hash.

21. The system of claim 20 wherein the extracted term information comprises at least one information field selected from the group consisting of:
   a last modification time field, indicating a most recent time in which the extracted term was received;
   a number of channels containing the term, indicating a number of information sources that provided the extracted term;
   a total instances field, indicating a number of times the extracted term was provided; and
   a terms inverted entries map, comprising of a plurality of terms inverted file entries, each entry holding information representative of a reception of the extracted term from a single information source.

22. The system of claim 21 wherein each inverted file entry comprises at least one field selected from the group consisting of:
   a channel identifier, for identifying the information source that provided the extracted term;
   instances number, for indicating a number of times the extracted term was provided by an information source; and
   time of last appearance, for indicating a most recent time in which the extracted term was received from an information source.

23. The system of claim 22 wherein each information packet is further associated to a message terms key map, said message key map comprising a plurality of message characteristic entries, each message characteristic entry associated to an extracted term being extracted from the information packet, said message characteristic entry comprising at least one of the following fields selected from the group consisting of:
   a term inverted file, for pointing to the term extracted information;
   an instance of number, for indicating a number of times said extracted term appeared in the information packet; and an inverted file entry, for pointing to a terms inverted file entry.

24. The system of claim 1 further adapted to insert an extracted term into a terms hash table and into a terms inverted file, insert an information source identification, said information source providing the extracted term, to a terms inverted entry map table in said terms inverted file, insert information packet data in a messages hash table; insert the extracted term from said information packet to a messages data table; increase a value of instances in said messages data table by one; and update a value of information source identification in said message data table.

25. The system of claim 24 further adapted to extract an extracted term and accordingly to perform at least one operation selected from the group consisting of:
   increase a value of total instances in said terms inverted file;
   update a value of last modification time in said terms inverted file;
   increase a value of instances number in said inverted entry map table associated with said information source identification in said terms inverted file; and
   update a value of message time in said messages data table.

26. The system of claim 1 further adapted to delete an information packet, and accordingly to perform at least one operation selected from the group consisting of:
   receive an information packet identification, wherein the terms extracted from the information packets are to be deleted;
   read the information packet identification from the messages hash table in said terms index data structure;
   obtain relevant entries of said extracted terms belonging to said information packet in said messages data; and
   access said terms inverted file for each said terms entry pointed to said terms inverted file.

27. The system of claim 1, further adapted to store alert criteria and to match alert criteria received and processed in the past against newly received terms to generate an alert.

28. The system of claim 1 further adapted to match the client query against historical archives of informational content to generate an archive query result.

29. The system of claim 28 wherein the system is further adapted to generate a query result from an archive query result and from a recent query result.

30. The system of claim 1 further adapted to match the client query against a semi-static database of said informational content and having a low incidence of changing to generate a semi static query result.

31. The system of claim 30 wherein the system is further adapted to generate a query result from a semi static query result and from a recent query result.

32. The system of step 1, further adapted to rank information sources according to a similarity between at least a portion of information packets provided by said information sources and between the client query.

33. The system of claim 32 further adapted to insert a list of ranked information sources in the query result.

34. The system of claim 33 wherein the step of ranking is based upon a parameter selected from the group consisting of: a total amount of extracted terms provided by an information source in a predefined time interval; an elapsed time since the extracted term was provided by the information source in said predefined time interval; and an extracted term position in the information source.

35. The system of claim 1 wherein an information source is selected from the group consisting of: television broadcast providers, radio broadcast providers, data network providers, chat channels providers, news providers, and music providers.

36. The system of claim 1 wherein information packets comprise of content selected from the group of: text, audio, video, multimedia, and executable code streaming media.

37. The system of claim 1 further adapted to compute a similarity between a client query and a group of at least one information packet.

38. The system of claim 37 wherein the group of at least one information packet comprises at least one information packet received from a single information source.

39. The system of claim 37 wherein the similarity reflects at least one of the following parameters:
  a total amount of extracted terms being received from at least one information source during a predefined time interval;
  a number of relevant extracted terms being received from at least one information source during the predefined time interval;
  a total number of information sources being searched during the predefined time interval;
  an elapsed time since a last appearance of a relevant extracted term from an information source during the predefined time interval;
  a position of relevant extracted terms in at least one information source;
  proximity of an extracted term to a relevant extracted term;
  a part of speech of a relevant extracted term; and
  a relevant extracted term frequency and importance in a language of the information source.

40. The system of claim 1 adapted to implement a matching technique selected from the group consisting of:
  Boolean based matching;
  probabilistic matching;
  fuzzy matching;
  proximity matching; and
  vector based matching.

41. The system of claim 1 adapted to implement complex matching techniques.

42. A media monitor system for monitoring content of a plurality of information streams provided by a plurality of information sources coupled to said media monitor system, said media monitor system adapted to be coupled to a plurality of client systems, said media monitor comprising:
  retrieval means, adapted to be coupled to the plurality of information sources, for receiving information streams from the information sources, and providing information signals comprising information packets representative of at least a portion of the information streams;
  distribution means, adapted to be coupled to a plurality of client systems, for receiving client queries and client requests to update or create alert criteria, and for providing client systems real time alerts and query results; and
  analysis means, coupled to the distribution means and to the retrieval means for storing said information signals provided by the retrieval means, for real time matching of information signals against alert criteria to generate a real time alert and for real time matching of client queries against the information signals to generate query results; wherein the analysis means comprises:
    a real time alert logic, for real time matching of information signals against alert criteria to generate a real time alert; wherein the real time alert logic comprises:
      an information packet processor, for receiving an information packet; and extracting at least one extracted term out of the information packet; said information packets either provided by an information source or representative of a portion of a received signal provided by an information source;
    storage means, configured to allow fast insertion and fast deletion of content, for storing matching term information representative of a reception of matching extracted terms, an alert criteria comprising at least one alert term;
    a storage means controller, coupled to the information packet processor and to the storage means, for receiving the at least one extracted term, for determining whether an extracted term out of said at least one extracted term matches an alert term, and accordingly for updating the matching term information; and
      an alert module, coupled to the storage means, for processing at least a portion of the matching extracted term information to determine whether to issue an alert; and for issuing at least one alert to at least one client system, according to said determination;
    real time search engine, for real time matching of client queries against the information signals to generate query results;
    wherein the real time search engine comprises:
      an information packet processor, for receiving an information packet and for processing the information packet to generate at least one processed portion of the information packet;
      storage means coupled to the information packet processor, for temporarily storing information representative of a reception of the at least one processed portion of the information packet, wherein the storage means are configured to allow fast insertion and fast deletion of content,
      a query and result manager, coupled to the storage means for matching a received client query against at least a portion of content of the storage means to generate a query result.

43. The system of claim 42 wherein the portion of the matching extracted term information is determined by at least one alert criteria.

44. The system of claim 43 wherein the at least one alert criteria comprises at least one alert term that matched the at least one matching extracted term.

45. The system of claim 42 wherein the matching term information is representative of a reception of matching extracted terms during a predetermined period of time.

46. The system of claim 42, wherein the storage means controller is further adapted to store the information packet and related control data in the storage means, and to link between the stored information packet and the matching extracted term information.

47. The system of claim 42 wherein the storage means holds a term index data structure.

48. The system of claim 42 wherein the information packet processor is further adapted to perform at least one preprocessing step selected from the group consisting of: adding control data to said information packet; filtering the information packet; processing an extracted term by adding control information to said extracted term; and filtering the extracted term, wherein said filtered extracted terms are matched against alert terms.

49. The system of claim 42 wherein the information packet processor is configured to extract an extracted term from an information packet by parsing and stemming the information packet.

50. The system of claim 42 wherein the storage means controller is adapted to delete information packets from the storage means, after a predetermined period has lapsed; and wherein a deletion of an information packet is followed by a deletion of the linked extracted term information.

51. The system of claim 42 wherein alert terms and matching terms information are stored in an alert terms hash, alert criteria are stored in an alert criteria map and wherein the linked information packets are stored in a message hash.

52. The system of claim 42 wherein the matching extracted term information comprises at least one information field selected from the group consisting of:
  a last modification time field, indicating a most recent time of reception of the matching extracted term, during a predetermined period of time;
  a number of channels containing term, indicating a number of information sources that provided the matching extracted term during a predetermined period of time;
  a total instances field, indicating a total amount of receptions of the matching extracted term during a predetermined period of time; and
  a terms inverted entries map, comprising a plurality of matching terms inverted file entries, each entry holding information representative of a reception of the matching extracted term from a single information source during a predetermined period of time.

53. The system of claim 52 wherein each matching term inverted file entry comprises at least one field selected from the group consisting of:
  a channel identifier, for identifying the information source that provided the matching extracted term during a predetermined period of time;
  instances number, for indicating a total amount of receptions of the matching extracted term from an information source during a predetermined period of time; and
  time of last appearance, for indicating a most recent time of reception of the matching extracted term from an information source during a predetermined period of time.

54. The system of step 53 wherein each information packet is further associated to a message terms key map, said message key map comprising a plurality of message characteristic entries, each message characteristic entry associated to a matching extracted term being extracted from the information packet, said message characteristic entry comprising at least one of the following fields selected from the group consisting of:
  a term inverted file, for pointing to the matching extracted term information;
  an instance of number, for indicating a number of times said matching extracted term appeared in the information packet; and
  an inverted file entry, for pointing to a terms inverted file entry.

55. The system of claim 54 wherein the storage means controller is further adapted to determine a deletion of an information packet and associated matching extracted term information.

56. The system of claim 42 wherein the storage means controller is adapted to access the message hash table, to obtain relevant entries of said matching extracted terms belonging to said information packet; and to access said matching extracted terms inverted file for each said matching extracted terms entry pointed to said matching extracted terms inverted file.

57. The system of claim 56 wherein the alert module is adapted to rank information sources according to a similarity between at least a portion of information packets provided by said information sources and between an alert criteria.

58. The system of claim 42, wherein said rank is based upon a parameter selected from the group consisting of:
  a total amount of extracted terms provided by an information source in a predefined time interval;
  an elapsed time since the extracted term was provided by the information source in said predefined time interval; and
  an extracted term position in the information source.

59. The system of claim 42 wherein an information source is selected from the group consisting of: data network providers, chat channels providers, news providers, and music providers.

60. The system of claim 42 wherein information packets comprise content selected from the group consisting of: text, audio, video, multimedia, and executable code streaming media.

61. The system of claim 42 further adapted to compute a similarity between an alert criteria and information indicating a reception of a group of at least one matching information packet.

62. The system of claim 61 wherein the group of at least one information packet comprises at least one information packet received from a single information source.

63. The system of claim 61 wherein the similarity reflects at least one of the following parameters:
  a total amount of extracted terms being received from at least one information source during a predefined time interval;
  a number of matching extracted terms being received from at least one information source during the predefined time interval;
  a total number of information sources being searched during the predefined time interval;
  an elapsed time since a last appearance of a matching extracted term from an information source during the predefined time interval;
  a position of matching extracted terms in at least one information source;
  an extracted term in proximity to a matching extracted term;
  a part of speech of a matching extracted term; and
  a matching extracted term frequency and importance in a language of the information source.

64. The system of claim 42 wherein the alert module is further adapted to implement a matching technique selected from the group consisting of:
  Boolean based matching;
  probabilistic matching;
  fuzzy matching;
  proximity matching; and
  vector based matching.

65. The system of claim 42 wherein the alert module is further adapted to implement complex matching techniques.

66. The system of claim 42 wherein an alert comprises at least one field selected from the group consisting of:
  an information source identifier field, for identifying an information source that either provided a matching extracted packer or for identifying an information source that provided a received signal, wherein a portion of said received signal is represented in an information packet from which the extracted term was extracted;

a link field, for allowing the client system to be linked to the information source or for allowing the client system to receive relevant information from said information source; and an information source category identification, identifying a category of information source that provided the matching extracted term.

67. The system of claim 66 wherein relevant information is selected from the group consisting of:

a multimedia stream originated by said information source;

a stream of information packets originated by said information source;

a multimedia stream associated to the information packet from which the extracted term was extracted;

a stream of information packets, comprising the extracted term.

68. The system of claim 42 wherein the information packet processor comprises at least one module selected from the group of modules consisting of:

a message coordinator module adapted to coordinate handling of a plurality of information packets;

a message filter module for filtering the plurality of information packets according to predefined rules;

a term extractor module for performing parsing and stemming on said plurality of information packets; and a terms filter for excluding extracted terms according to predefined rules.

69. The system of claim 42, wherein the storage means holds a term index data structure, said term index data structure further comprising:

an alert terms hash table to hold alert terms;

a matching extracted terms inverted file pointed to by said alert term hash table holding a matching extracted terms inverted entry map;

a messages hash table to hold information packets identification;

a messages data table to hold information packets data; and a channel map to hold a list of information sources and the related number of index terms of said information source.

70. The system of claim 69 wherein the terms inverted file further comprises:

a matching extracted terms inverted entries map table;

a total instances of said matching extracted term;

a number of information sources containing said matching extracted term; and a last modification time of said matching extracted term.

71. The system of claim 70 further comprising:

a message terms keyed map;

an information source identification; and an information packet time of arrival.

72. The system of claim 71 wherein the message terms keyed map further comprises:

a pointer to said matching extracted terms inverted file;

an instances number of said matching extracted term in said information packet; and a pointer to said inverted file entry related to said matching extracted term.

73. The system of claim 72 wherein the matching extracted terms inverted entries map further comprises:

an information source identification;

an instances number of said matching extracted term in said information source informational content; and a time of last appearance of said matching extracted term in said information source informational content.

74. The system of claim 42 wherein the storage means further allows timely deletions of irrelevant or time-decayed terms and query-terms.

75. The system of claim 42 further comprising an alert criteria module, coupled to the storage means, to the storage means controller and to a plurality of client systems, for handling client system requests and for updating alert criteria.

76. The system of claim 75 wherein the alert criteria module comprises at least one module selected from the group consisting of:

an alert criteria coordinator module to coordinate the processing of alert criteria;

an alert term extractor to parse and stem incoming alert criteria in order to extract and process operative alert terms; and an alert terms filter for excluding specific alert terms in a predefined manner.

* * * * *